(12) United States Patent
Feder et al.

(10) Patent No.: US 9,361,319 B2
(45) Date of Patent: Jun. 7, 2016

(54) SYSTEMS, METHODS, AND COMPUTER PROGRAM PRODUCTS FOR DIGITAL PHOTOGRAPHY

(71) Applicant: Duelight LLC, Sunnyvale, CA (US)

(72) Inventors: Adam Feder, Mountain View, CA (US);
Brian Kindle, Sunnyvale, CA (US);
William Rivard, Menlo Park, CA (US)

(73) Assignee: Duelight LLC, Sunnyvale, CA (US)

( * ) Notice: Subject to any disclaimer, the term of this patent is extended or adjusted under 35 U.S.C. 154(b) by 0 days.

(21) Appl. No.: 14/503,224

(22) Filed: Sep. 30, 2014

(65) Prior Publication Data

US 2015/0092077 A1    Apr. 2, 2015

Related U.S. Application Data

(60) Provisional application No. 61/960,945, filed on Sep. 30, 2013.

(51) Int. Cl.
| | | |
|---|---|---|
| *G06F 17/30* | (2006.01) | |
| *H04N 5/232* | (2006.01) | |
| *G06T 11/60* | (2006.01) | |
| *G06T 11/00* | (2006.01) | |
| *G06T 5/50* | (2006.01) | |
| *H04N 1/00* | (2006.01) | |

(52) U.S. Cl.
CPC ............ *G06F 17/3028* (2013.01); *G06T 5/50* (2013.01); *G06T 11/00* (2013.01); *G06T 11/60* (2013.01); *H04N 1/00* (2013.01); *H04N 5/23229* (2013.01); *G06T 2207/20221* (2013.01)

(58) Field of Classification Search
CPC ................... G06T 2207/10152; G06T 5/008;
G06T 5/50; G06T 11/00; G06T 11/60; H04N 5/23229; H04N 5/2354; H04N 5/23216; H04N 5/23293
See application file for complete search history.

(56) References Cited

U.S. PATENT DOCUMENTS

| | | | |
|---|---|---|---|
| 5,778,948 A | 7/1998 | Gomyo et al. | |
| 8,797,337 B1 | 8/2014 | Labour et al. | |
| 8,878,963 B2 * | 11/2014 | Prabhudesai | ........... G06T 5/002 348/241 |
| 8,988,559 B2 * | 3/2015 | Chao | .................... H04N 5/2621 348/220.1 |
| 9,083,935 B2 * | 7/2015 | Demandolx | ......... H04N 5/2354 |
| 9,218,662 B1 | 12/2015 | Feder et al. | |
| 2001/0009437 A1 | 7/2001 | Klein et al. | |
| 2001/0033284 A1 | 10/2001 | Chan | |
| 2002/0003545 A1 | 1/2002 | Nakamura | |
| 2002/0060566 A1 | 5/2002 | Debbins et al. | |
| 2002/0107750 A1 | 8/2002 | Kanevsky et al. | |
| 2003/0206654 A1 | 11/2003 | Teng | |
| 2004/0059783 A1 | 3/2004 | Kazui et al. | |

(Continued)

OTHER PUBLICATIONS

Non-Final Office Action from U.S. Appl. No. 14/843,896, dated Jan. 14, 2016.

(Continued)

*Primary Examiner* — Jingge Wu
(74) *Attorney, Agent, or Firm* — Zilka-Kotab, PC

(57) ABSTRACT

A system, method, and computer program product are provided for digital photography. In use, a method and apparatus are provided for identifying an object including a synthetic image that is generated based on a first image and a second image. Next, an output image is generated utilizing the object and a viewing parameter. Lastly, the output image is outputted. Additional systems, methods, and computer program products are also presented.

19 Claims, 21 Drawing Sheets

(56) References Cited

U.S. PATENT DOCUMENTS

| | | | |
|---|---|---|---|
| 2005/0089212 A1 | 4/2005 | Mashitani et al. | |
| 2006/0008171 A1* | 1/2006 | Petschnigg | G06T 5/50 382/254 |
| 2006/0133375 A1 | 6/2006 | Napierala | |
| 2006/0225034 A1 | 10/2006 | Peck et al. | |
| 2006/0262363 A1 | 11/2006 | Henley | |
| 2007/0025720 A1* | 2/2007 | Raskar | G03B 7/16 396/213 |
| 2007/0070364 A1 | 3/2007 | Henley | |
| 2007/0101251 A1 | 5/2007 | Lee et al. | |
| 2007/0146538 A1 | 6/2007 | Kakinuma et al. | |
| 2007/0165960 A1* | 7/2007 | Yamada | H04N 9/735 382/254 |
| 2007/0260979 A1 | 11/2007 | Hertzfeld et al. | |
| 2008/0225057 A1 | 9/2008 | Hertzfeld et al. | |
| 2008/0275881 A1 | 11/2008 | Conn et al. | |
| 2009/0085919 A1 | 4/2009 | Chen et al. | |
| 2010/0013842 A1 | 1/2010 | Green et al. | |
| 2010/0118038 A1 | 5/2010 | Labour et al. | |
| 2010/0299630 A1 | 11/2010 | Mccutchen et al. | |
| 2011/0145694 A1* | 6/2011 | Graves | G06F 17/30905 715/234 |
| 2011/0205395 A1* | 8/2011 | Levy | H04N 5/23229 348/229.1 |
| 2012/0066355 A1 | 3/2012 | Tiwari et al. | |
| 2013/0021358 A1 | 1/2013 | Nordlund et al. | |
| 2013/0141456 A1* | 6/2013 | Sokolov | G06F 3/14 345/620 |
| 2013/0179308 A1 | 7/2013 | Agustin et al. | |
| 2013/0235069 A1 | 9/2013 | Ubillos et al. | |
| 2013/0262258 A1 | 10/2013 | Jennings | |
| 2013/0342739 A1 | 12/2013 | Yanowitz et al. | |
| 2014/0043628 A1 | 2/2014 | Kishino et al. | |
| 2014/0098118 A1 | 4/2014 | Liu et al. | |
| 2014/0111657 A1 | 4/2014 | Weatherford et al. | |
| 2014/0129966 A1 | 5/2014 | Kolesnikov et al. | |
| 2014/0140630 A1* | 5/2014 | Hwang | G06F 17/30256 382/218 |
| 2014/0176759 A1* | 6/2014 | Goto | H04N 5/2354 348/224.1 |
| 2014/0210847 A1 | 7/2014 | Knibbeler et al. | |
| 2014/0279181 A1 | 9/2014 | Wills | |
| 2014/0283113 A1 | 9/2014 | Hanna | |
| 2014/0289360 A1 | 9/2014 | Mahkovec et al. | |
| 2014/0298323 A1 | 10/2014 | Stolberg et al. | |
| 2014/0351687 A1 | 11/2014 | Hall | |
| 2015/0016735 A1 | 1/2015 | Kikuchi | |
| 2015/0063694 A1* | 3/2015 | Shroff | G06T 11/60 382/167 |
| 2015/0093044 A1 | 4/2015 | Feder et al. | |
| 2015/0178977 A1 | 6/2015 | Kontkanen | |
| 2015/0195330 A1 | 7/2015 | Lee | |
| 2015/0373414 A1 | 12/2015 | Kinoshita | |
| 2016/0092472 A1 | 3/2016 | Feder et al. | |

OTHER PUBLICATIONS

Non-Final Office Action from U.S. Appl. No. 14/503,210, dated Jan. 12, 2016.
Kindle, B. et al., U.S. Appl. No. 14/547,074, filed Nov. 18, 2014.
Feder, A., et. al., U.S. Appl. No. 14/517,731, filed Oct. 17, 2014.
Feder, A. el al., U.S. Appl. No. 14/535,285, filed Nov. 6, 2014.
Non-Final Office Action from U.S. Appl. No. 14/535,285, dated Feb. 3, 2015.
Notice of Allowance from U.S. Appl. No. 14/535,285, dated Jul. 31, 2015.
Non-Final Office Action from U.S. Appl. No. 14/517,731, dated Oct. 6, 2015.
Restriction Requirement from U.S Appl. No. 14/503,210, dated Oct. 16, 2015.
Notice of Allowance from U.S. Appl. No. 14/535,285, dated Oct. 15, 2015.
Feder, A., et. al., U.S. Appl. No. 14/843,896, filed Sep. 2, 2015.
Non-Final Office Action from U.S. Appl. No. 14/547,074, dated Feb. 26, 2016.

* cited by examiner

SYSTEMS, METHODS, AND COMPUTER PROGRAM PRODUCTS FOR DIGITAL PHOTOGRAPHY

RELATED APPLICATIONS

This application claims priority to US provisional patent application no. 61/960,945, filed Sep. 30, 2013 and entitled "SYSTEMS, METHODS, AND COMPUTER PROGRAM PRODUCTS FOR DIGITAL PHOTOGRAPHY," the entire contents of which are incorporated herein by reference. Additionally, this application is related to the following U.S. patent applications, the entire disclosures being incorporated by reference herein: application Ser. No. 14/503,210, filed Sep. 30, 2014, entitled "SYSTEMS, METHODS, AND COMPUTER PROGRAM PRODUCTS FOR DIGITAL PHOTOGRAPHY."

FIELD OF THE INVENTION

The present invention relates to photographic systems, and more specifically to systems and methods for digital photography.

BACKGROUND

Traditional digital photography systems allow users to capture, edit, and share digital photographs. A sender may edit a digital photograph according to their personal preferences, and share the edited digital photograph with a recipient, such as through an email or social network service.

SUMMARY

A system, method, and computer program product are provided for digital photography. In use, a method and apparatus are provided for identifying an object including a synthetic image that is generated based on a first image and a second image. Next, an output image is generated utilizing the object and a viewing parameter. Lastly, the output image is outputted. Additional systems, methods, and computer program products are also presented.

DETAILED DESCRIPTION

Embodiments of the present invention enable a wireless mobile device to share a dynamic image object (DIO), thereby enabling a recipient to modify their view of an image generated from the DIO using a DIO viewer that is configured to include an interactive user interface (UI) control. In certain embodiments, the DIO viewer may comprise an independent application program. In other embodiments, the DIO viewer may be implemented as a feature of another application having additional features. In one embodiment, the wireless mobile device may be configured to cause a data service system to generate a DIO by processing one or more digital images transmitted from the wireless mobile device to the data service system.

In one embodiment, a DIO may comprise a data object configured to include at least two digital images and may include metadata associated with the at least two digital images. In one embodiment, the metadata may include information related to generating a display image based on combining the at least two digital images. The metadata may also include one or more functions used to generate the display image, an additional image used to generate the display image, or any combination thereof. In another embodiment, a DIO may comprise a data object configured to include one digital image and metadata that may include one or more functions used to generate a display image from the one digital image. The DIO construct is described in greater detail below in FIGS. 4A-4C.

In one embodiment, a given DIO may be presented to a user through the wireless mobile device executing a DIO viewer and, optionally, presented similarly to other users through different wireless mobile devices or through any other technically feasible computing devices. While certain embodiments are described in conjunction with a wireless mobile device, other embodiments employing different technically feasible computing devices configured to implement the techniques taught herein are within the scope and spirit of the present invention.

Figure 1A:
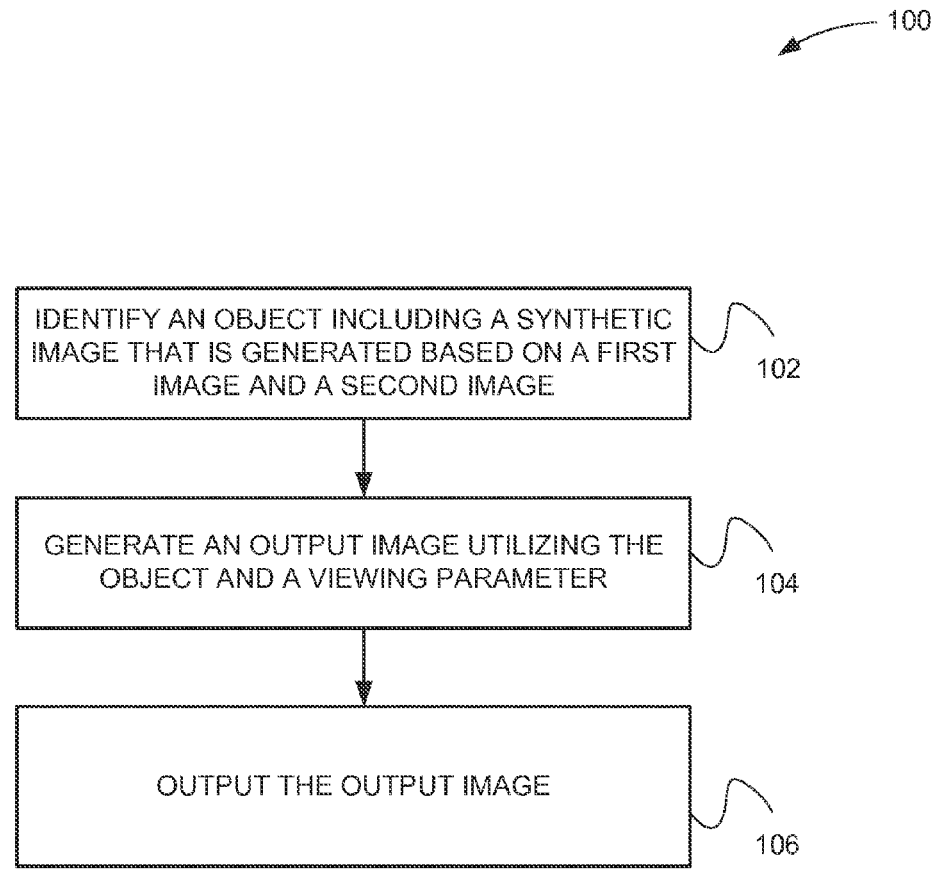
FIG. 1A shows a method for outputting an output image, in accordance with one embodiment.

FIG. 1A shows a method 100 for outputting an output image, in accordance with one embodiment. As an option, the method 100 may be implemented in the context of the details of any of the Figures. Of course, however, the method 100 may be carried out in any desired environment. Further, the aforementioned definitions may equally apply to the description below.

As shown, an object including a synthetic image that is generated based on a first image and a second image is identified. See operation 102. Additionally, an output image utilizing the object and a viewing parameter is generated. See operation 104. Further, the output image is outputted. See operation 106.

In various embodiments, the first image may be an ambient image and the second image may be a flash image. Of course, in other embodiments, the first image and the second image may be any type of image.

In the context of the present description, a synthetic image includes any image that is based on a combination of at least two input images. In one optional embodiment, such combination may be accomplished utilizing an image synthesis algorithm, and/or any process capable of combining two images together.

In some embodiments, the object may include a dynamic image object. Additionally, in other embodiments, the object may store the first image, the second image, metadata, image metadata (e.g. data associated with the first image and/or second image (and/or any other image), etc.), view behavior metadata, generation behavior metadata, and/or any other information or data which may relate to any of the images in some manner. In one embodiment, any of the data stored in the object, including the first image, the second image, and/or any of the metadata may be used in the generation of the output image.

In one embodiment, the first image or the second image may be used to produce at least one processed image. In another embodiment, the processed image may be stored in the object. Additionally, in one embodiment, at least one processed image corresponding to at least one of the first image or the second image may be stored in the object, for use in the generation of the output image.

In the context of the present description, a viewing parameter includes any parameter that is used to view an image. In one embodiment, a viewing parameter may be used to view a synthetic image, a processed image, the first image, the second image, and/or any other image. In another embodiment, the viewing parameter may be user selectable. In one embodiment, the viewing parameter may include device type, screen size, processor type, amount of RAM, input type, and/or any other feature which may affect how the image (e.g. synthetic image, etc.) is displayed. Additionally, in one embodiment, the viewing parameter may be user selectable.

In various embodiments, operating parameters associated with the viewing parameter may include an ability to control a blend (or mix) between a first image and a second image (and/or any number of images), an exposure, a brightness, a color, a contrast, a sharpness, a filter (e.g. watercolor, color-selection, etc.), a saturation, and/or any other feature which may alter the resulting image in some manner.

Still yet, in one embodiment, a second synthetic image may be generated based on the first synthetic image and at least one of the first image or the second image. Of course, any number of synthetic images may be created based on any previously created synthetic images and/or based on a combination of a previously created synthetic image and the first image or the second image or another image. In one embodiment, the second synthetic image may be stored in the object for use with a viewing parameter. Additionally, in one embodiment, another synthetic image based on the synthetic image and at least one of the first image or the second image may be stored in the object, for use in the generation of the output image.

In one embodiment, the object for use with a viewing parameter may be accessible over a network. For example, in one embodiment, the object may be stored initially on a mobile device. In some embodiments, the mobile device may only store the object for a limited duration. In other embodiments, the object may be sent to a server and transmitted via a network. In one embodiment, the object may be identified by receiving the object from a server, by receiving the object on a client, and/or from or at any other device.

In another embodiment, identifying the first image may include receiving the first image utilizing at least one server. In one embodiment, the identifying the second image may include receiving the second image utilizing the at least one server. Further, in one embodiment, the synthetic image may be generated and stored utilizing the at least one server. In an additional embodiment, the synthetic image may be generated and stored utilizing at least one client.

In one embodiment, application code may be provided for utilizing the object to generate an output image, such that the viewing parameter may be capable of being adjusted utilizing the application code. In another embodiment, a sliding indicia may be displayed, where the viewing parameter is capable of being adjusted in response to sliding user manipulation of the sliding indicia. Still yet, in one embodiment, the output image may be generated utilizing the synthetic image and at least one of the first image or the second image.

Figure 1B:
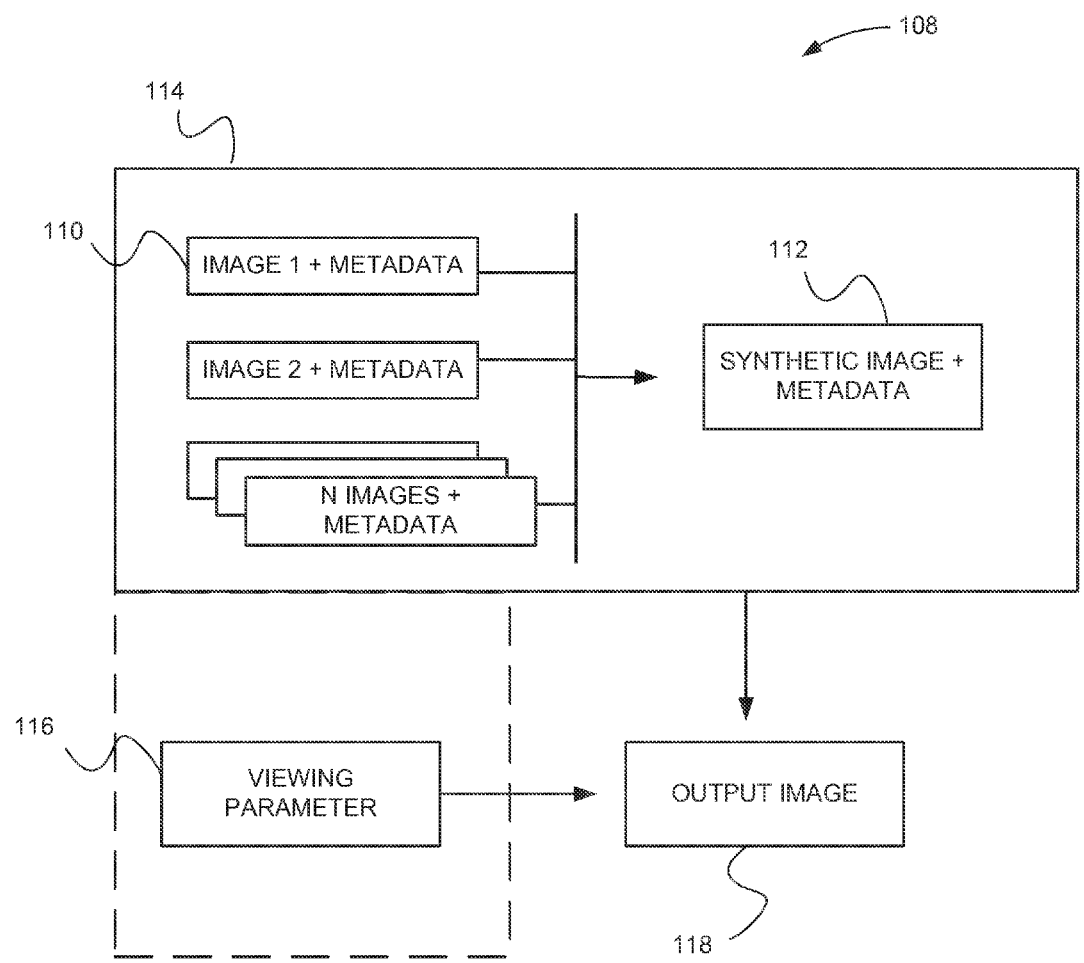
FIG. 1B shows a process for outputting an output image, in accordance with one embodiment.

FIG. 1B shows a process 108 for outputting an output image, in accordance with one embodiment. As an option, the process 108 may be implemented in the context of the details of any of the Figures. Of course, however, the process 108 may be carried out in any desired environment. Further, the aforementioned definitions may equally apply to the description below.

As shown, the process includes image 1+metadata and image 2+metadata. See element 110. Additionally, the process may include any number of images and corresponding metadata. In one embodiment, the two or more images and the accompanying metadata are used to create a synthetic image with accompanying metadata. See element 112. In one embodiment, an input image (for creating the synthetic image) may include any number of images, and may include original images (not yet processed), as well as synthetic images (already processed).

In one embodiment, the process includes an object. See element 114. In various embodiments, the object may include one or more images, metadata, one or more synthetic images, a viewing parameter, and any other data which may be relevant to the one or more images. In one embodiment, the viewing parameter may not be included in the object may be provided separately.

As shown, the process includes a viewing parameter. See element 116. Additionally, based on the viewing parameter and the object, an output image is outputted. See element 118. In some embodiments, the outputted image may be temporarily saved (e.g. on the server system, etc.) until the user decides to finalize the changes. In other embodiments, if a set threshold of time has been exceeded (e.g. without any changes being made, etc.), the outputted image may be saved in a more permanent manner (e.g. in a non-transitory memory system, etc.).

In one embodiment, outputting the output image may include applying one or more actions to the outputted image, including sharing the outputted image with one or more recipients (e.g. individuals, social network connections, etc.), saving the outputted images to a predefined location (e.g. on the user's hard drive, on Dropbox, on Google Drive, etc.), creating a second version (e.g. low resolution, etc.) of the outputted image (e.g. for sharing with limited bandwidth, etc.), and/or applying any other action to the image after it has been outputted.

In another embodiment, feedback may be received from a user relating to the outputted image. For example, in one embodiment, a user may select to change the blend of a first image and a second image. The outputted image may be displayed based on the user's input. Once the user has finished making any changes to the outputted image, the user may save the outputted image.

Figure 1C:
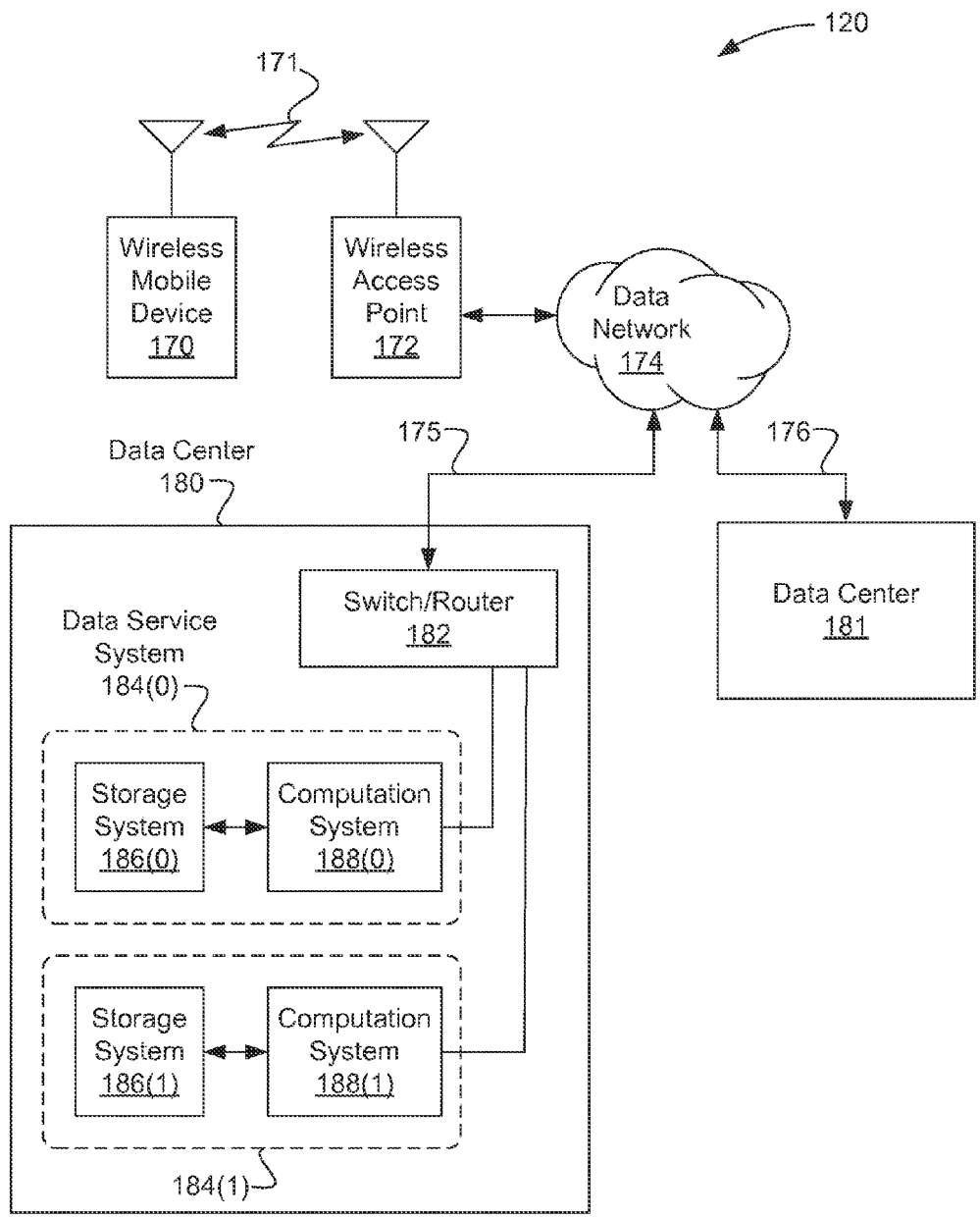
FIG. 1C illustrates a network service system, configured to implement one or more aspects of the present invention.

FIG. 1C illustrates a network service system 120, configured to implement one or more aspects of the present invention. As shown, network service system 120 includes a wireless mobile device 170, a wireless access point 172, a data network 174, and a data center 180. Wireless mobile device 170 communicates with wireless access point 172 via a digital radio link 171 to send and receive digital data, including data associated with digital images. Wireless mobile device 170 and wireless access point 172 may implement any technically feasible transmission techniques for transmitting digital data via digital radio link 171 without departing the scope and spirit of the present invention.

Wireless mobile device 170 may comprise a smart phone configured to include a digital camera, a digital camera configured to include wireless connectivity, a reality augmentation device, a laptop configured to include a digital camera and wireless connectivity, or any other technically feasible computing device configured to include a digital camera and wireless connectivity.

Wireless access point 172 is configured to communicate with wireless mobile device 170 via digital radio link 171 and to communicate with data network 174 via any technically feasible transmission media, such as any electrical, optical, or radio transmission media. For example, wireless access point 172 may communicate with data network 174 through an optical fiber coupled to wireless access point 172 and to a router system or a switch system within data network 174. A network link 175, such as a wide area network (WAN) link, is configured to transmit data between data network 174 and a data center 180.

In various embodiments, data network 174 may include routers, switches, long-haul transmission systems, provisioning systems, authorization systems, and any technically feasible combination of communications and operations subsystems configured to convey data between network endpoints, such as between wireless access point 172 and data center 180. Additionally, wireless mobile device 170 may comprise one of a plurality of wireless mobile devices configured to communicate with data center 180 via one or more wireless access points coupled to data network 174.

Data center 180 may include, without limitation, a switch/router 182 and at least one data service system 184. Switch/router 182 is configured to forward data traffic between and among network link 175, and each data service system 184. Switch/router 182 may implement any technically feasible transmission techniques, such as Ethernet media layer transmission, layer 2 switching, layer 3 routing, and the like. Switch/router 182 may comprise one or more individual systems configured to transmit data between data service systems 184 and data network 174. In one embodiment, switch/router 182 implements session-level load balancing among plural data service systems 184.

In one embodiment, each data service system 184 may include at least one computation system 188 and may also include one or more storage systems 186. In another embodiment, each computation system 188 may comprise one or more processing unit, such as a central processing unit, a graphics processing unit, or any combination thereof. A given data service system 184 may be implemented as a physical system comprising one or more physically distinct systems configured to operate together. Alternatively, a given data service system 184 may be implemented as a virtual system comprising one or more virtual systems executing on an arbitrary physical system. In certain scenarios, data network 174 is configured to transmit data between data center 180 and another data center 181, such as through network link 176.

Still yet, in some embodiments, network service system 120 may be described in specific terms herein, but any system of wireless mobile devices configured to communicate with one or more data service systems may be configured to implement one or more embodiments of the present invention. Certain embodiments of the present invention may be practiced with a peer-to-peer network, such as an ad-hoc wireless network established between two different mobile wireless devices. In such embodiments, digital image data may be transmitted between two mobile wireless devices without having to send the digital image data to data center 180.

Figure 2A:
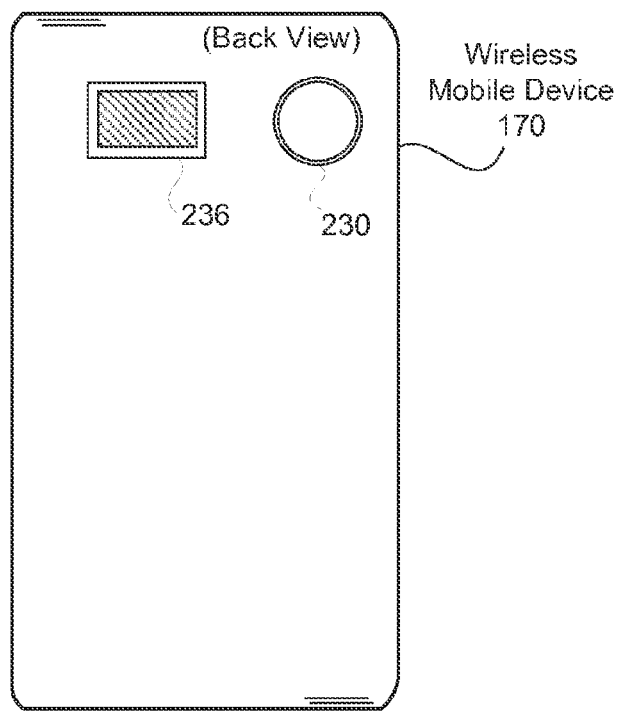
FIG. 2A illustrates a back view of a wireless mobile device comprising a digital camera, according to one embodiment of the present invention.

FIG. 2A illustrates a back view of wireless mobile device 170, comprising a digital camera 230, according to one embodiment of the present invention. Wireless mobile device 170 may also include a strobe unit 236, configured to generate illumination. In certain settings, strobe unit 236 may be activated to generate illumination while digital camera 230 generates a digital image by sampling a scene.

Figure 2B:
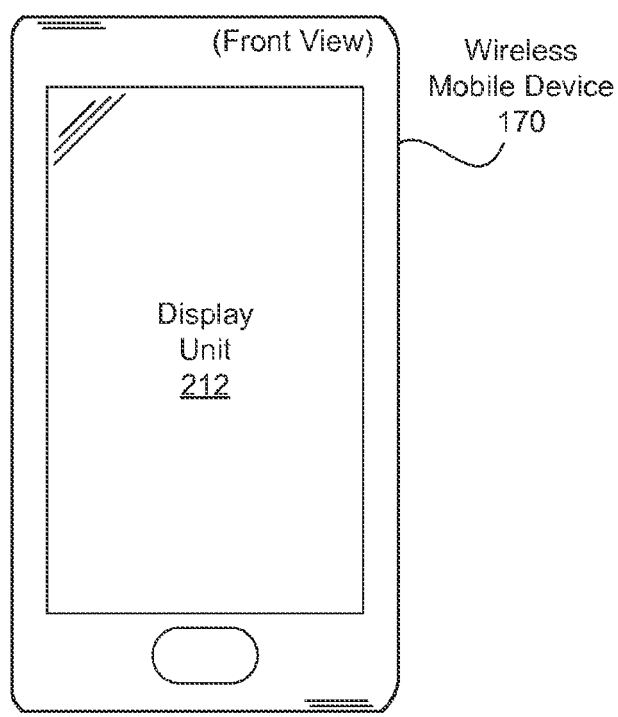
FIG. 2B illustrates a front view of a wireless mobile device, according to one embodiment of the present invention.

FIG. 2B illustrates a front view of wireless mobile device 170, according to one embodiment of the present invention. As shown, wireless mobile device 170 may include a display unit 212, configured to display image data, such as image data associated with images sampled by digital camera 230. Display unit 212 may also display user interface elements, such as a UI control, associated with software applications configured to execute on wireless mobile device 170, and the like.

Figure 2C:
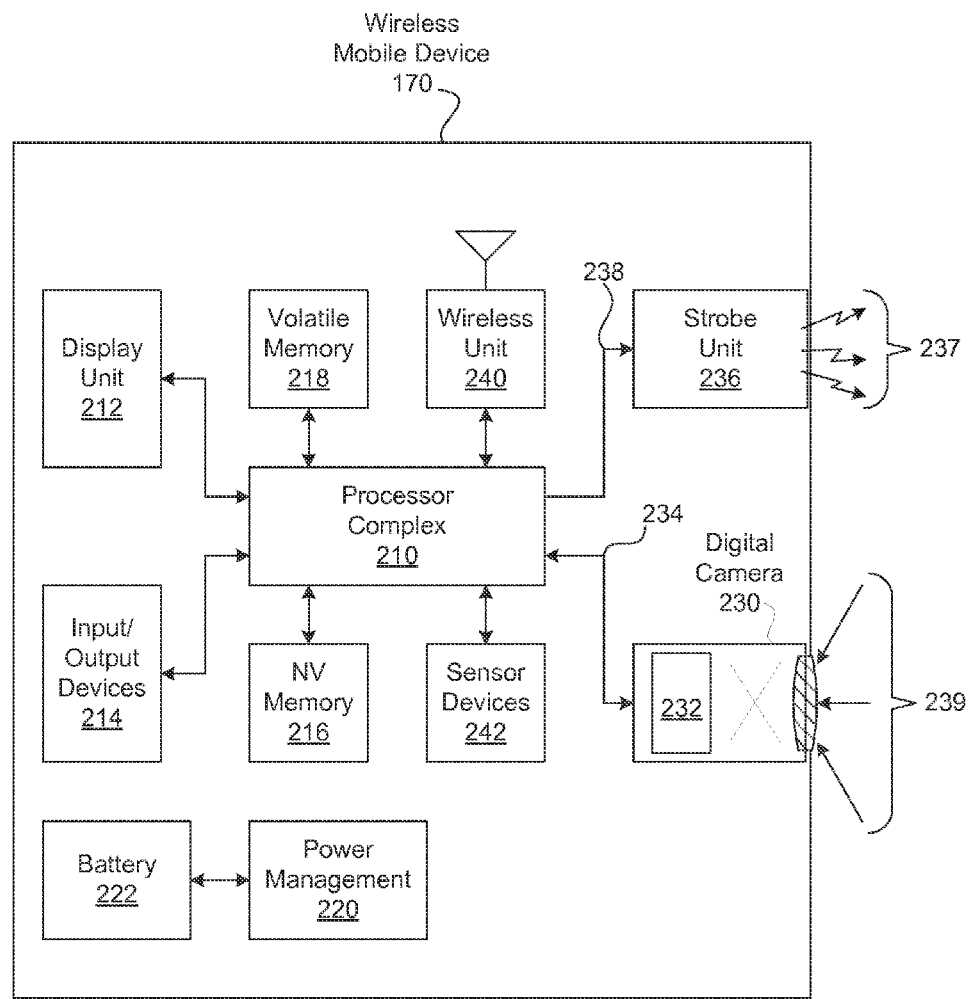
FIG. 2C illustrates a block diagram of a wireless mobile device, according to one embodiment of the present invention.

FIG. 2C illustrates a block diagram of wireless mobile device 170, according to one embodiment of the present invention. Wireless mobile device 170 may include a processor complex 210 coupled to digital camera 230. Wireless mobile device 170 may also include, without limitation, a display unit 212, a set of input/output devices 214, non-volatile memory 216, volatile memory 218, a wireless unit 240, and sensor devices 242, coupled to processor complex 210. In one embodiment, a power management subsystem 220 is configured to generate appropriate power supply voltages for each electrical load element within wireless mobile device 170, and a battery 222 is configured to supply electrical energy to power management subsystem 220. Battery 222 may implement any technically feasible battery, including primary or rechargeable battery technologies. Alternatively, battery 222 may be implemented as a fuel cell, or a high capacity electrical capacitor.

Processor complex 210 may include one or more central processing unit (CPU) core, one or more graphics processing unit (GPU), a memory controller coupled to memory subsystems such as volatile memory 218 and NV memory 216, a frame buffer controller coupled to display unit 212, and peripheral controllers coupled to input/output devices 214, sensor devices, and the like. Processor complex 210 may be configured to execute an operating system and an application program. The application program may include programming instructions directed to a CPU execution model, programming instructions directed to a GPU execution model, or any technically feasible combination thereof. In one embodiment the operating system is loaded for execution from NV memory 216.

In one embodiment, strobe unit 236 is integrated into wireless mobile device 170 and configured to provide strobe illumination 237 that is synchronized with an image capture event performed by digital camera 230. In an alternative embodiment, strobe unit 236 is implemented as an independent device from wireless mobile device 170 and configured to provide strobe illumination 237 that is synchronized with an image capture event performed by digital camera 230. Strobe unit 236 may comprise one or more LED devices, one or more Xenon cavity devices, one or more instances of another technically feasible illumination device, or any combination thereof. In one embodiment, strobe unit 236 is directed to either emit illumination or not emit illumination via a strobe control signal 238, which may implement any technically feasible signal transmission protocol. Strobe control signal 238 may also indicate an illumination intensity level for strobe unit 236.

In one usage scenario, strobe illumination 237 comprises at least a portion of overall illumination in a scene being photographed by digital camera 230. Optical scene information 239, which may include strobe illumination 237 reflected or reemitted from objects in the scene, is focused onto an image sensor 232 as an optical image. Image sensor 232, within digital camera 230, generates an electronic representation of the optical image. The electronic representation comprises spatial color intensity information, which may include different color intensity samples for red, green, and blue light. In alternative embodiments the color intensity samples may include, without limitation, cyan, magenta, and yellow spatial color intensity information. Persons skilled in the art will recognize that other sets of spatial color intensity information may be implemented without departing the scope of embodiments of the present invention. The electronic representation is transmitted to processor complex 210 via interconnect 234, which may implement any technically feasible signal transmission protocol.

Display unit 212 is configured to display a two-dimensional array of pixels to form a digital image for display. Display unit 212 may comprise a liquid-crystal display, an organic LED display, or any other technically feasible type of display. Input/output devices 214 may include, without limitation, a capacitive touch input surface, a resistive tablet input surface, buttons, knobs, or any other technically feasible device for receiving user input and converting the input to electrical signals. In one embodiment, display unit 212 and a capacitive touch input surface comprise a touch entry display system, configured to display digital images and to receive user touch input. Input/output devices 214 may also include a speaker and may further include a microphone.

Non-volatile (NV) memory 216 is configured to store data when power is interrupted. In one embodiment, NV memory 216 comprises one or more flash memory chips or modules. NV memory 216 may be configured to include programming instructions for execution by one or more processing units within processor complex 210. The programming instructions may include, without limitation, an application program, an operating system (OS), user interface (UI) modules, imaging processing and storage modules, and modules implementing one or more embodiments of techniques taught herein. NV memory 216 may include both fixed and removable devices. One or more memory devices comprising NV memory 216 may be packaged as a module that can be installed or removed by a user. NV memory 216 may be configured to store one or more digital images, such as digital images sampled by digital camera 230. In one embodiment, volatile memory 218 comprises dynamic random access memory (DRAM) configured to temporarily store programming instructions, image data, and the like. Sensor devices 242 may include, without limitation, an accelerometer configured to detect directional force, an electronic gyroscope configured to detect motion or orientation, a magnetic flux detector configured to detect orientation, a global positioning system (GPS) module configured to detect geographic position, or any combination thereof.

Wireless unit 240 may include one or more digital radios configured to transmit and receive digital data. In particular, wireless unit 240 may implement wireless transmission standards known in the art as "WiFi" based on institute for electrical and electronics engineers (IEEE) standard 802.11, digital cellular telephony standards for data communication such as the well-known "3G," long term evolution ("LTE") standards, "4G" standards, or any technically feasible combination thereof. In one embodiment, wireless mobile device 170 is configured to transmit one or more digital photographs residing within either NV memory 216 or volatile memory 218 to an online photographic media service via wireless unit 240. In such an embodiment, a user may possess credentials to access the online photographic media service and to transmit the one or more digital photographs for storage, sharing, and presentation by the online photographic media service. The credentials may be stored within or generated within wireless mobile device 170 prior to transmission of the digital photographs. The online photographic media service may comprise a social networking service, photograph sharing service, or any other web-based service that provides storage and transmission of digital photographs.

In one embodiment, wireless mobile device 170 comprises a plurality of digital cameras 230 configured to sample multiple views of a scene. In one implementation, a plurality of digital cameras 230 is configured to sample a wide angle to generate a panoramic photograph. In another implementation, a plurality of digital cameras 230 is configured to sample two or more narrow angles to generate a stereoscopic photograph. In yet another implementation, a plurality of digital cameras 230 is configured to sample a plurality of focus points to generate a synthetic focus image. In still yet another embodiment, a plurality of digital cameras 230 is configured to sample a plurality of different exposures to generate a high dynamic range image.

Figure 2D:
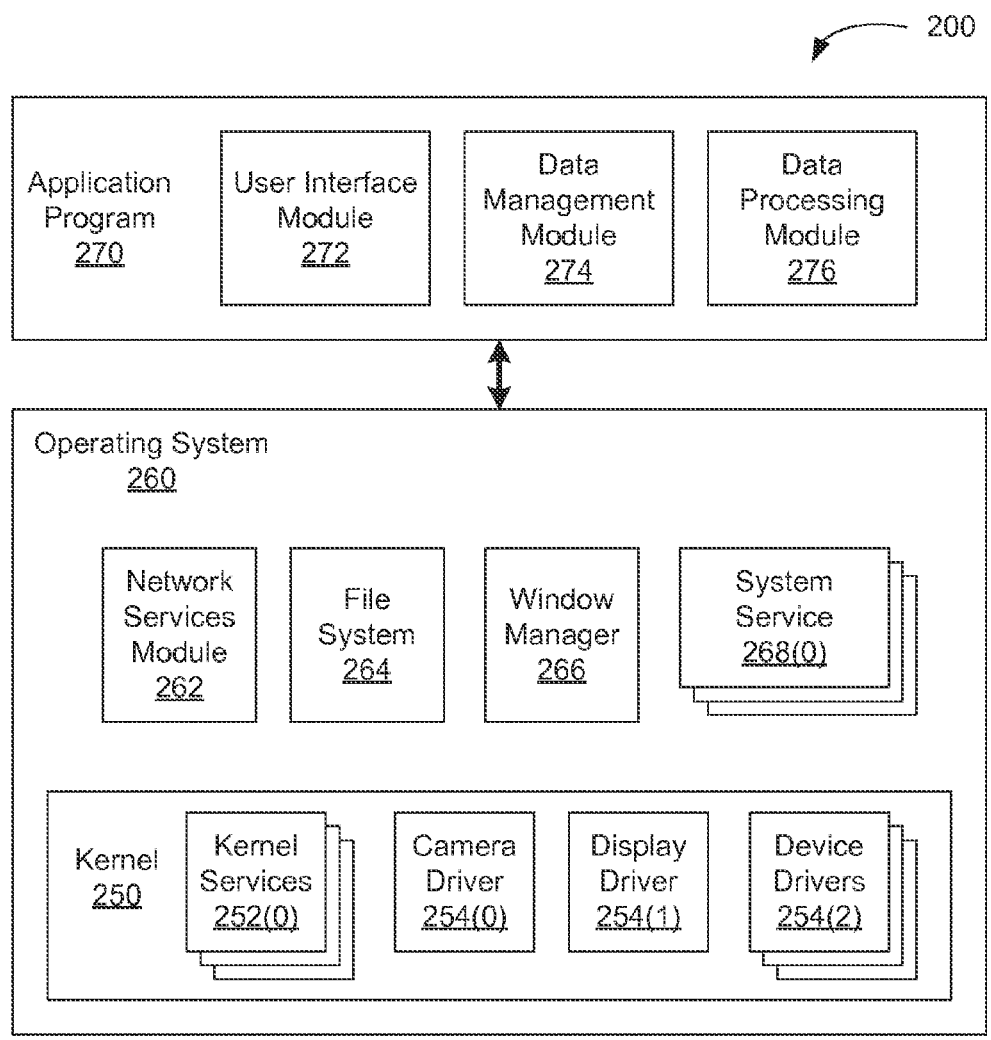
FIG. 2D illustrates an exemplary software architecture of a wireless mobile device, according to one embodiment of the present invention.

FIG. 2D illustrates an exemplary software architecture 200 of wireless mobile device 170, according to one embodiment of the present invention. Software architecture 200 may include an operating system 260, and an application program 270 configured to execute in conjunction with the operating system. In one embodiment, application program 270 includes a user interface (UI) module 272, a data management module 274, and a data processing module 276. Operating system 260 includes a kernel 250, a network services module 262, and a file system 264. Operating system 260 may also include a window manager 266 and one or more system services 268. While network services module 262, file system 264, window manager 266, and system services 268 are shown here as being implemented external to kernel 250, portions of each may be implemented within kernel 250.

In one embodiment, kernel 250 may include one or more kernel service modules 252, and one or more device drivers 254, configured to manage hardware devices and to present an abstracted programming interface to client software modules requesting access to the hardware devices. Kernel services modules 252 may be configured to provide process control services, memory management services, and the like. In one embodiment, a camera driver 254(0) is configured to manage operation of digital camera 230 and a display driver 254(1) is configured to manage operation of display unit 212. Another device driver (not shown) may be configured to manage operation of wireless unit 240, and so forth. Certain device drivers 254 may be configured to present a corresponding device as a system resource having functionality that is abstracted through an application programming interface (API).

In some embodiments, network services module 262 may provide services related to network connectivity, data transmission, and data stream management. In one embodiment, network services module 262 implements network protocols, such as the well-known suite of protocols referred to in the art as Internet protocol (IP). Network services module 262 may also implement wireless communication protocols and control stacks, such as those related to cellular communications (LTE, etc.) and local network communications (WiFi, etc.). Network services module 262 may be implemented as a collection of different service modules, each configured to execute in conjunction with operating system 260.

In one embodiment, file system 264 may implement a file abstraction over unstructured or block level storage. For example, in one embodiment, file system 264 may present an organized, hierarchical file system of named files and directories that are mapped onto sequential storage blocks comprising a flash memory implementation of NV memory 216. In such an example, application program 270 may access files by name without regard to physical layout within NV memory 216.

In another embodiment, window manager 266 may include tools and subsystems for providing a data metaphor comprising windows and data objects for intuitive user interaction. Window manager 266 may also implement a collection of interactive UI tools, which may be called and configured by application program 270. Window manager 266 may also implement a runtime environment for managing different events, such as user input events, such as certain user events that require a corresponding update to UI state. Additional system services may be implemented in system services 268. For example, in one embodiment, a runtime event manager may be implemented as a system service 268, which is called by window manager 266.

Still yet, in one embodiment, application program 270 may include programming instructions that implement tangible user interaction behaviors. For example, in one embodiment, application program 270 may cause operating system 260 to display a window with UI objects, such as input widgets and one or more output display surfaces. In another embodiment the window and related UI objects may be displayed on display unit 212 of FIG. 2C. In one embodiment, UI module 272 may be configured to define and manage UI objects comprising an application user interface associated with application program 270. In a mode-view-controller application architecture, UI module 272 may implement view functions and controller functions. UI module 272 may call window manager 266 to implement certain functions. Certain model functions may be implemented by data management module 274 and data processing module 276. Data management module 274 may include a database subsystem for storing, organizing, retrieving, and otherwise managing data objects, such as digital photos and related metadata. Data management module 274 may call certain system services modules 268 for certain common data management operations. Data processing module 276 may include, without limitation, image processing functions for operating on digital images. For example, in one embodiment, data processing module 276 may include image compression functions, such as JPEG compressor and extractor functions, high-dynamic range (HDR) functions for generating a digital image from an HDR stack, image alignment operations for aligning related images, image merge operations for combining data associated with related images, such as HDR images or flash-ambient images, and the like.

In one embodiment, application program 270 is configured to execute within processor complex 210 of FIG. 2C. The application program may enable a user to cause digital camera 230 to sample one or more digital images in response to a shutter release event. The one or more digital images are stored within NV memory 216. One exemplary shutter release event comprises a user activating a UI widget, such as a UI button control. The one or more digital images may then be processed by data processing module 276 and one or more resulting images stored to NV memory 216 or volatile memory 218. One or more resulting images may be shared through a digital wireless connection facilitated by wireless unit 240.

Sharing an image may include transmitting image data from one user to one or more different users, or from one device to one or more different devices. The process of sharing may be accomplished according to an arbitrary technique or chronology. For example, a device may transmit image data to a server during one time interval, after which the server makes the image data available to different devices. A different device may then retrieve the image data during a second time interval. The first time interval and the second time interval may be separated by an arbitrary time duration. In one embodiment, sharing comprises a first step of transmitting image data from a first device to a server, and a second step of transmitting image data from the server to a second device. In another embodiment, sharing may comprise transmitting image data from the first device to the second device as a peer-to-peer transmission. In each embodiment, an access control system, such as an account login or account credentials system, may implement controls on which users or which devices may access a particular set of image data.

Figure 3A:
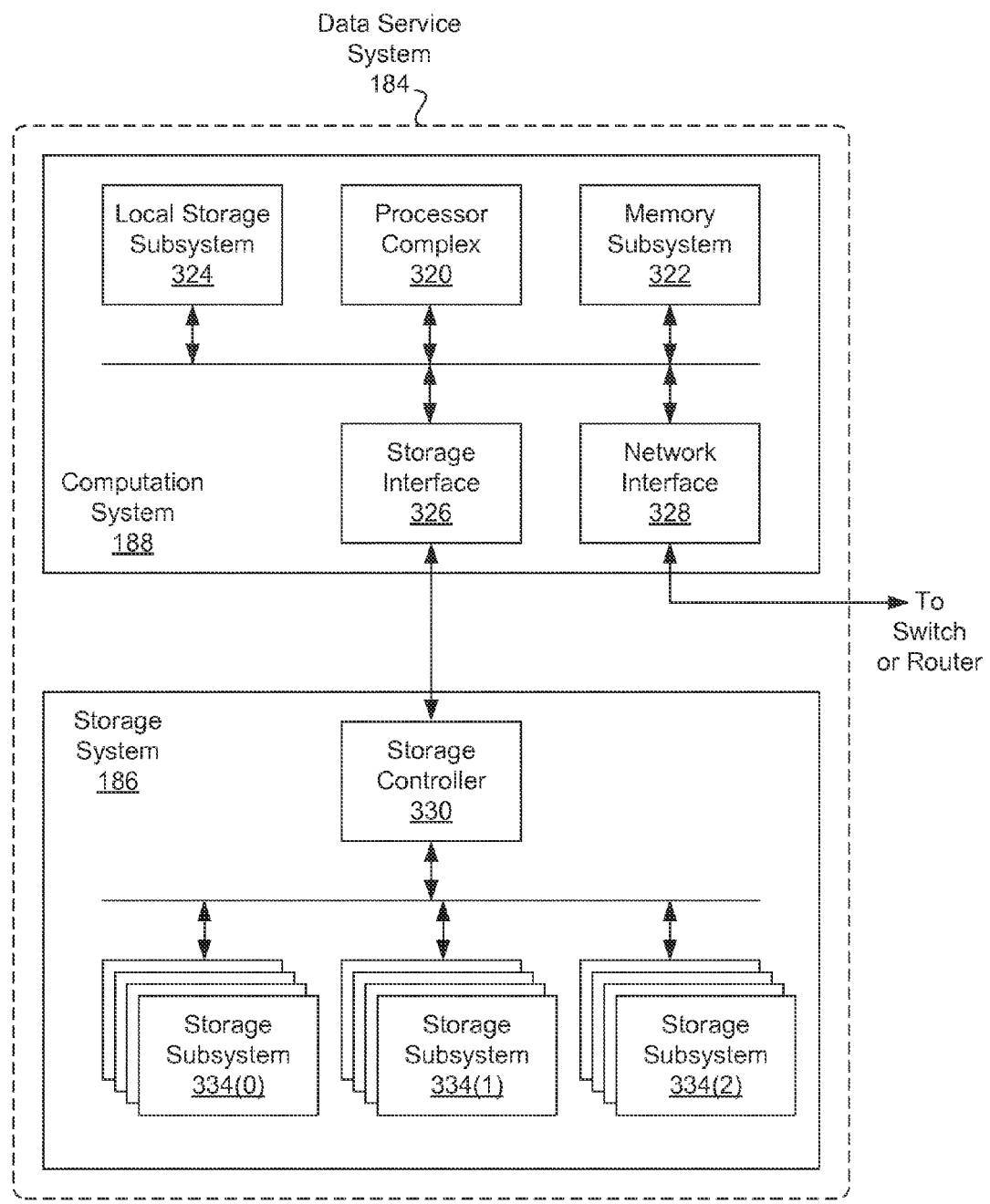
FIG. 3A illustrates a block diagram of a data service system, configured to implement one or more aspects of the present invention.

FIG. 3A illustrates a block diagram of data service system 184 of FIG. 1C, configured to implement one or more aspects of the present invention. Data service system 184 includes a computation system 188 coupled to a storage system 186. Computation system 188 includes a processor complex 320, a memory subsystem 322, a network interface 328, and a storage interface 326. Computation system 188 may also include a local storage subsystem 324, comprising, without limitation, a magnetic hard disk drive or solid-state drive.

In one embodiment, processor complex 320 may comprise one or more processing units coupled to memory subsystem 322, which may include dynamic random access memory (DRAM), or any other technically feasible form of system memory. Each of the processing units may comprise a central processing unit (CPU), graphics processing unit (GPU), digital signal processor (DSP), or any technically feasible combination thereof. In one embodiment, each GPU may comprise a plurality of thread processors configured to execute corresponding instances of one or more thread programs. Processing units within processor complex 320 may be configured to execute programming instructions stored within memory subsystem 322, local storage system 324, a local cache (not shown), or any other technically feasible memory or storage subsystem.

In one embodiment, network interface 328 may implement an Ethernet interface and storage interface 326 may implement a Fibre Channel interface. In other embodiments, storage interface 326 may implement a second Ethernet interface and a block level storage protocol or a file level storage protocol. In still other embodiments, storage interface 326 may implement a direct attachment storage protocol, such as external serial advanced technology attachment (e-SATA).

In one embodiment, storage system 186 may be configured to store data within storage subsystems 334. A storage controller 330 may be configured to manage data stored within storage subsystems 334. In one embodiment, storage controller 330 may comprise a processing unit (not shown) and storage adapters (not shown) coupled to storage subsystems 334. The processing unit may be configured to implement a file system, a block storage system, or any technically feasible combination thereof. Storage controller 330 may implement any technically feasible storage protocol for networked or directly attached storage devices. Data may be written to storage subsystems 334 or read from storage subsystems 334 in response to a storage access request transmitted from computation system 188 to storage system 186 through storage controller 330.

In certain embodiments, computation system 188 may comprise virtual computation resources configured to be independent of specific hardware computation resources. For example, in one embodiment, a virtual machine may implement virtual processing units, virtual storage interfaces, virtual network interfaces, and the like. Similarly, storage system 186 may comprise virtual storage resources configured to be independent of specific hardware storage resources. For example, a virtual file system may implement virtual storage units mapped on to arbitrary physical storage resource. In another example, a virtual object data store may implement object storage functions that are independent of underlying physical storage resources and, may be independent of any underlying file system.

Figure 3B:
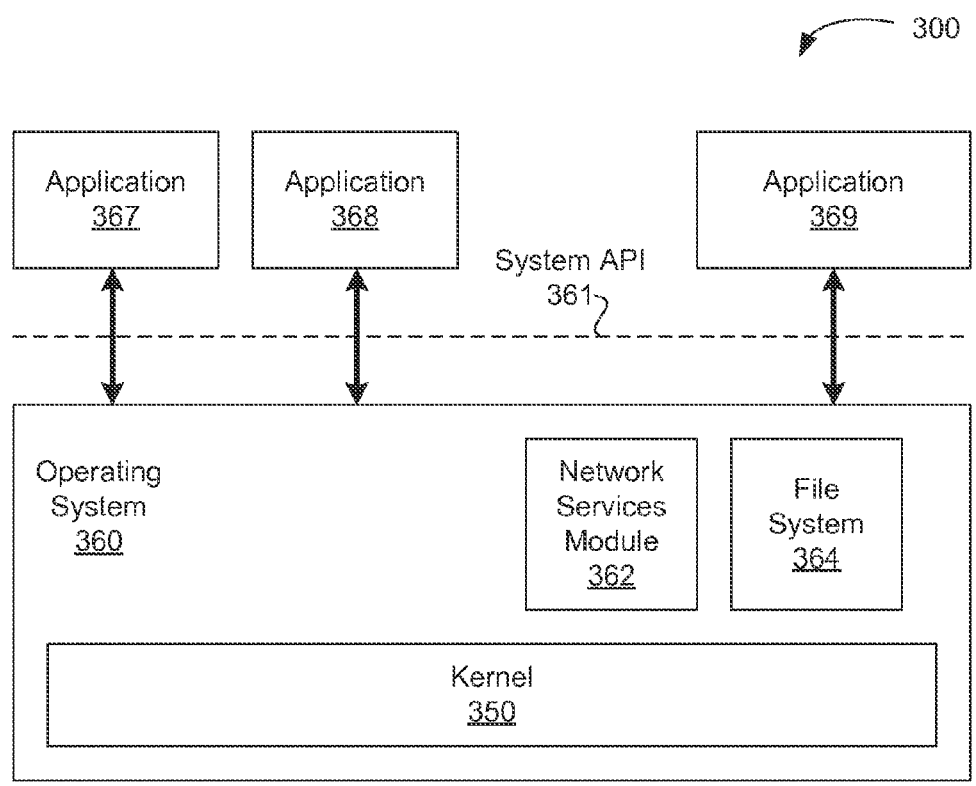
FIG. 3B illustrates an exemplary system software architecture for a computation system within a data service system, configured to implement one or more aspects of the present invention.

FIG. 3B illustrates an exemplary software architecture 300 for a computation system 188 of FIG. 1C within data service system 184, configured to implement one or more aspects of the present invention. In one embodiment, elements of software architecture 300 are configured to execute within processor complex 320 of computation system 188. Software architecture 300 may include one or more applications 367, 368, 369 configured to execute in conjunction with a system API 361. Software architecture 300 may also include an operating system 360, configured to implement certain system functions and avail certain system resources through system API 361. Operating system 360 may include a kernel 350, a network services module 362, and a file system 364. In certain embodiments, at least a portion of network services module 362 may be implemented within kernel 350. Similarly, in certain embodiments, at least a portion of file system 364 may be implemented within kernel 350. Network services module 362 may implement networking functions and protocol stacks for communicating with other devices, such as through network interface 328.

Applications 367, 368, 369 may be configured to implement specific services related to generation of and sharing of a DIO. In one embodiment, an application 367 may be configured to receive and store a DIO, discussed in greater detail below in FIGS. 4A-4C. Application 367 may be further configured to share a DIO. In one embodiment, an application 368 may be configured to receive and store image data for generating a DIO. Application 368 may be further configured to share the generated DIO. In one embodiment, an application 369 may be configured to receive and store image data for generating a DIO. Application 369 may then transmit the image data to an image processing server, which may generate the DIO and transmit the DIO to application 369. Application 369 may be further configured to share the DIO generated by the image processing server.

In one embodiment, system API 361 may comprise an API implemented by a virtual operating system, which may be configured to execute on a virtual machine. In this way, applications 367-369 may be configured to execute independently with respect to specific physical hardware resources. As illustrated below in FIG. 3C, an application space may be implemented that is independent of specific physical resources, allowing applications to execute as needed on available physical resources.

Figure 3C:
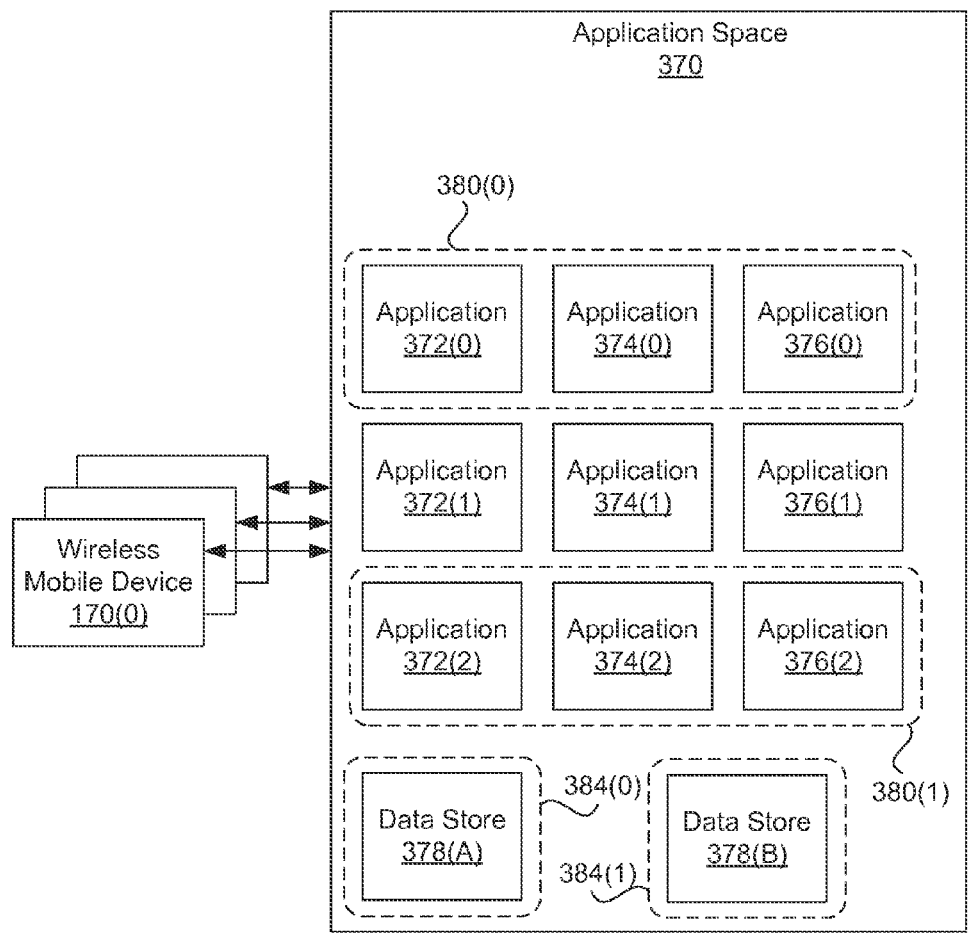
FIG. 3C illustrates an exemplary application space, according to one embodiment of the present invention.

FIG. 3C illustrates an exemplary application space 370, according to one embodiment of the present invention. Each application 372, 374, 376 within application space 370 may execute within a private virtual memory space, and a private process space. In various embodiments, application 372(0) may represent a first instance of application 372, application 372(1) may represent a second instance of application 372, and so forth. Inter-process communication (IPC) among applications 372, 374, 376, and data stores 378 may be performed through a shared memory space, a socket system, a data network, or any other technically feasible technique.

Data stores 378 may be configured to store data for an application 372, 374, 376. For example, application 372(0) may be configured to store data within data store 378(A) through a file system interface. Alternatively application 372(0) may be configured to store data within data store 378(A) through a data object interface. Each application and each data store within application space 370 may be mapped to a corresponding physical resource. For example, application 372(0) may be mapped to a computation server 380(0), while applications 372(2), 374(2), 376(2) may be mapped to a computation server 380(1). Similarly, data store 378(A) may be mapped to a first physical storage system 384(0), while data store 378(B) may be mapped to a second, different physical storage system 384(1). In certain embodiments, data store 378(A) and 378(B) are configured to substantially mirror stored data, and physical storage system 384(0) is disposed in a geographically different physical location from physical storage system 384(1). In such a configuration, either data store 378(A) or data store 378(B) may be disabled, such as due to a natural disaster, but data availability within the application space 370 is maintained for uninterrupted operation by a mirror copy. Computation servers 380 may also be disposed in different geographical locations to enable continued availability of each application 372, 374, 376 in the event a certain data center is disabled. Within the same data center, different computation servers 380 and different data stores 378 may be configured to provide resource redundancy for continued operation, such as continued operation following a fault condition associated with one or more computation servers 380.

In one embodiment, each application 372, 374, 376 may be configured for fully reentrant operation, with each selected point of progress by each application recorded within a data store 378 through a reliable transaction mechanism, such as a database transaction of file journal transaction.

One or more wireless mobile devices 170 may be configured to communicate with a corresponding instance of one or more applications within application space 370. For example, during a given time span, wireless mobile device 170(0) may transmit image data to application 374(0), which may concurrently or subsequently store the image data within data store 378(0). In one embodiment, application 374(0) may be configured to apply one or more image processing algorithms to inbound image data from wireless mobile device 170(0) to generate associated processed image data, which is then stored to data store 378(0).

In one embodiment, one or more applications 372, 374, 376 are mapped onto an instance of computation system 188 for execution. Multiple instances of computation system 188 may host an arbitrary set of mapped applications. A given data store 378 may be mapped onto one instance of storage system 186, while a different data store 378 may be mapped onto an arbitrary instance of storage system 186. In certain embodiments, a computation system 188 may implement a storage application, and a data store 378 may comprise the storage application coupled to an instance of storage system 186.

Figure 4A:
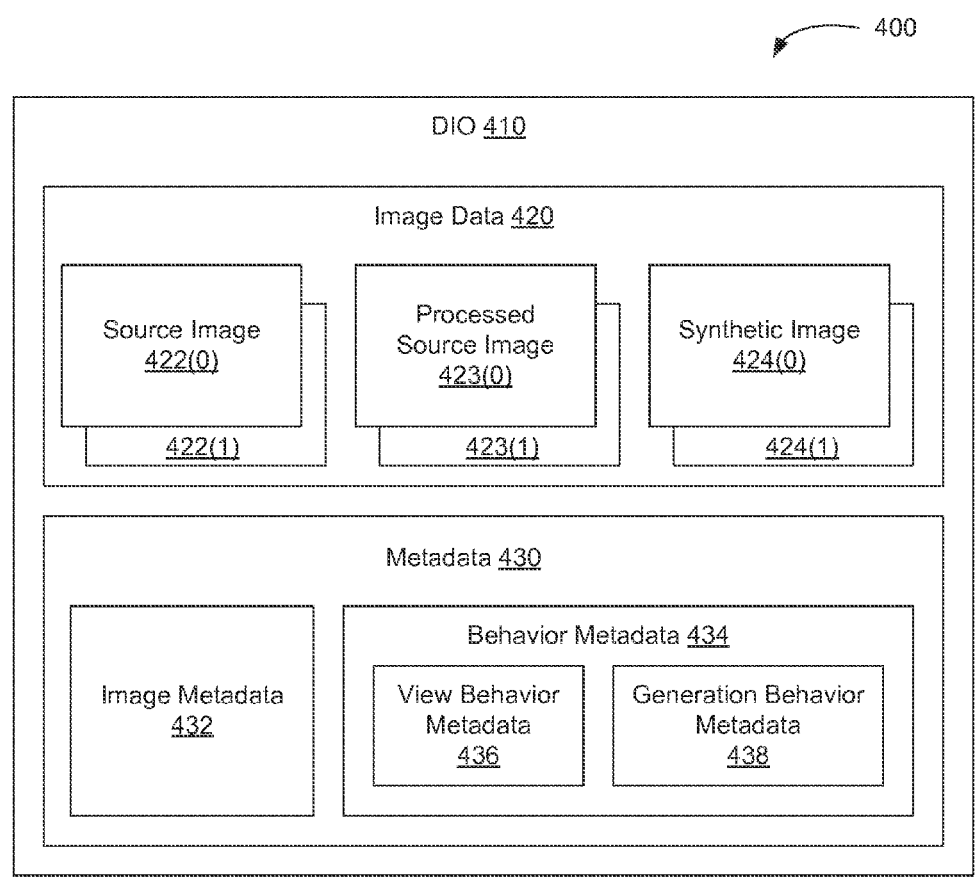
FIG. 4A illustrates an exemplary data structure comprising a dynamic image object, according to one embodiment of the present invention.

FIG. 4A illustrates an exemplary data structure 400 comprising a DIO 410, according to one embodiment of the present invention. As shown, DIO 410 includes metadata 430 and image data 420, comprising at least one image. In one embodiment, the at least one image may include one or more source images 422, one or more processed source images 423, one or more synthetic images 424, or any combination thereof. In one embodiment, each source image 422 may comprise a digital photograph that may have been sampled by a digital camera, such as digital camera 230 of FIG. 2A.

In another embodiment, each processed source image 423 may be generated from a corresponding source image 422 through an appropriate image processing algorithm. The image processing algorithm may implement, without limitation, resolution adjustment (resizing), level adjustment, sharpness adjustment, contrast adjustment, color adjustment, alignment adjustment, or any combination thereof. Each synthetic image 424 may be generated based on a combination of at least two input images through an image synthesis algorithm. The at least two input images may comprise one or more source images 422, one or more processed source images 423, one or more synthetic images 424, or any combination thereof.

In one embodiment, metadata 430 may include image metadata 432 and behavior metadata 434. Image metadata 432 may include configuration information associated with one or more source images 422, such as exposure conditions, lens configuration, geographic location information, other sampling information, or any combination thereof. Image metadata 432 may also include information associated with how one or more images are generated. The one or more images may include one or more processed source images 423, one or more synthetic images 424, or any combination thereof. Behavior metadata 434 may include view behavior metadata 436, generation behavior metadata 438, or any combination thereof. View behavior metadata 436 may specify how image data 420 should be viewed or displayed to a user by specifying functions for performing operations related thereto. Generation behavior metadata 438 may specify how a processed source image 423, a synthetic image 424, or any combination thereof should be generated by specifying functions for performing image generation operations related thereto.

In one embodiment, view behavior metadata 436 may comprise a reference to a predefined function for combining one or more images from image data 420 into a display image, which may be displayed to a user, such as through display unit 212 of FIG. 2B. For example, view behavior metadata 436 may specify a reference to a linear alpha blend operation to be performed on an ordered set of images comprising a processed source image 423, a first synthetic image 424(0), and a second synthetic image 425. In one implementation, a value of alpha for the linear alpha blend operation may be determined by a real-time continuous value UI control, which the user may manipulate to achieve a desired resulting image. In another example, view behavior metadata 436 may specify a linear alpha blend operation to be performed on a processed source image 423 and a synthetic image 424. In other examples, view behavior metadata 436 may specify non-linear blend operations, spatially variant blend operations such as gradient blends, and the like. In one embodiment, the real-time continuous value UI control may comprise a linear slider, illustrated below in FIG. 8.

In another embodiment, view behavior metadata 436 may comprise programming instructions to be performed for combining one or more images from image data 420 into a display image, which may be displayed to the user. In one example, view behavior metadata 436 may include programming instructions for generating pixels within the display image. The programming instructions may be specified according to any technically feasible programming language. For example, view behavior metadata 436 may include programming instructions specified as an OpenGL shader, according to the well-known language of OpenGL. In one embodiment, a viewer application configured to display DIO 410 may submit the OpenGL shader to an OpenGL compiler for execution by a GPU residing within processor complex 210 to generate the display image. The OpenGL shader may receive, as input, a parameter determined by the real-time continuous value UI control.

In one embodiment, generation behavior metadata 438 may comprise a reference to a predefined function for generating one or more processed source images 423, generating one or more synthetic images 424, or any combination thereof. For example, generation behavior metadata 438 may specify a reference to a blend operation configured to generate a synthetic image 424 by combining a first processed source image 423(0) and a second processed source image 423(1). The first processed source image 423(0) may be generated from a corresponding source image 422(0), sampled by digital camera 230 of FIG. 2A, using ambient illumination. The second processed source image 423(1) may be generated from a corresponding source image 422(1), sampled by digital camera 230, using both ambient illumination and strobe illumination provided by strobe unit 236. The processed source images 423 may be aligned in a previously performed alignment step. In another example, generation behavior metadata 438 specifies a reference to an HDR blend operation that generates a synthetic image 424 by combining processed source images 423 comprising an aligned HDR image stack. Each processed source image 423 may be generated by aligning a corresponding source image 422 with other source images 422 or other processed source images 423. Of course, in other embodiments, any technically feasible techniques may be implemented to combine images within the HDR image stack to generate one or more synthetic images 424.

In another embodiment, generation behavior metadata 438 may comprise programming instructions to be performed for generating one or more processed source images 423, one or more synthetic images 424, or any combination thereof. In one example, generation behavior metadata 438 may include programming instructions specified as an OpenGL shader, according to the well-known language of OpenGL. In certain embodiments, a viewer application configured to display DIO 410 may submit the OpenGL shader to an OpenGL compiler for execution by a GPU residing within processor complex 210 to generate one or more synthetic images 424. The OpenGL shader may receive, as input, a parameter determined by a UI control as an algorithmic input parameter. Alternatively, the OpenGL shader may operate according to default parameter settings appropriate to an associated image processing algorithm implemented by the OpenGL shader.

In one embodiment, processed source image 423(0) may comprise a digital photograph generated from a source image 422(0) taken under ambient lighting conditions, while processed source image 423(1) comprises a digital photograph generated from a source image 422(1) taken with both strobe illumination and ambient illumination. In another embodiment, a synthetic image 424 may be generated from the processed source images 423(0), 423(1), and stored within DIO 410. The synthetic image 424 may be generated by combining source image 422(0) and source image 422(1), such as through a non-linear, per-pixel contribution function, an alpha (opacity) blend function, and/or any other technically feasible function or combination or functions suitable for combining images. In another embodiment, two or more source images 422 may comprise an HDR image stack sampled by digital camera 230. Metadata 430 may be populated with alignment information for aligning the two or more source images 422 in preparation for performing an HDR merge operation. DIO 410 may further include a synthetic image 424 comprising an HDR merge of the HDR image stack.

In certain embodiments, two or more processed source images 423 may be generated based on the same algorithm, but with different corresponding algorithmic parameters. For example, a first processed source image 423(0) may be generated from source image 422(0) by performing an intensity curve compensation operation to recover tone from shadows, while a second processed source image 423(1) may be generated from source image 422(0) by performing an intensity curve compensation operation to recover tone from highlights. In one embodiment, a DIO 410 configured to present both processed source images 423(0), 423(1) may store the processed source images 423(0) and 423(1). In an alternative embodiment, the DIO 410 may include source images 422(0) and 422(1), and additionally may include generation behavior metadata 438 that specifies functions for performing the intensity curve compensation operations for generating processed source images 423(0) and 423(1).

In one embodiment, DIO 410 may include one or more source images 422, one or more processed source images 423, and a shader function (e.g. an OpenGL shader), which may be stored within generation behavior metadata 438. The DIO viewer may use the generation behavior metadata 438 to generate one or more synthetic images 424. In another embodiment, the DIO viewer may implement viewing behavior based on view behavior metadata 436.

In one embodiment, source images 422 may be stored as difference images relative to a reference source image 422(0). Each source image 422 may be generated from a corresponding difference image and the reference image 422(0). A given difference image may advantageously require less data than its corresponding source image 422. In one embodiment, a difference operation may comprise a component color space numerical difference, a chroma-luminance color space difference, and/or any other technically feasible color space difference. A difference operation may further comprise a motion estimation operation relative to the reference source image. A difference operation may comprise an offset and/or scale value per pixel or region, the offset and/or scale values being represented in a compressed format within the difference image. In another embodiment, certain processed source images 423 may be stored as difference images relative to a processed source image 423, or a source image 422.

In certain embodiments, a processed source image 423 or a synthetic image 424 may represent an intermediate algorithmic step and the synthetic image need not be rendered ("materialized") into a memory buffer. Instead, in such an embodiment, each image represents an intermediate step within a processing pipeline, and final pixel values for a displayed image may be computed by performing certain pipeline steps within a single shader pass, thereby obviating any need intermediate buffers with intermediate image data. In certain embodiments, metadata 430 may be configured to include results of certain computations associated with generating a final image for display. For example, metadata 430 may include alignment parameters that, when applied to source images 422, expedite generating an HDR merge of source images 422. Alternatively, source images 422 may be aligned and stored as corresponding processed images 423.

Figure 4B:
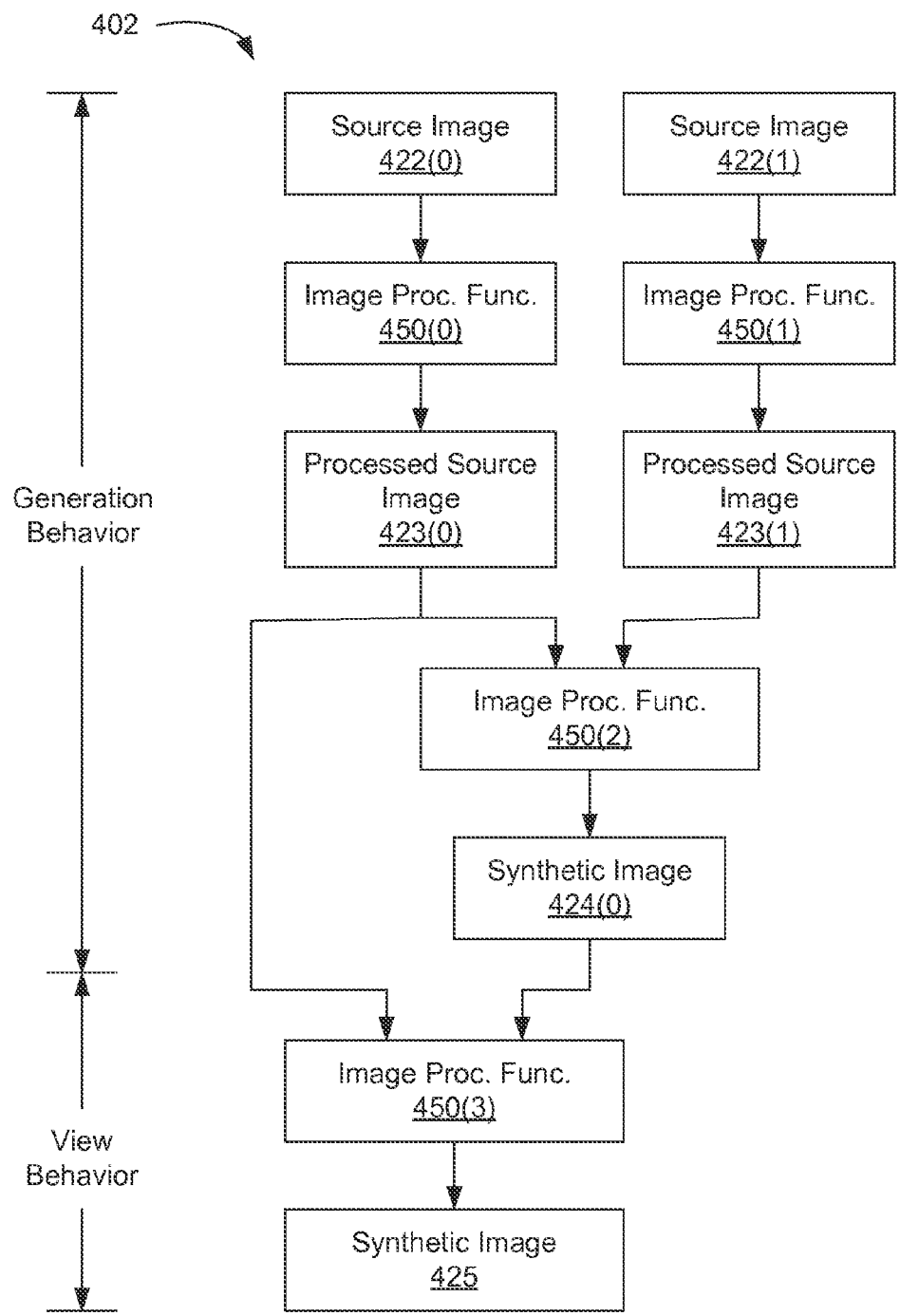
FIG. 4B illustrates a first dataflow process for generating a synthetic image comprising a dynamic image object, according to one embodiment of the present invention.

FIG. 4B illustrates a first dataflow process 402 for generating a synthetic image 425 comprising dynamic image object 410 of FIG. 4A, according to one embodiment of the present invention. As shown, processed source images 423(0), 423(1) are each generated from a respective source image 422(0) through a corresponding image processing function 450. Synthetic image 424(0) is generated by combining processed source images 423(0) and 423(1) through image processing function 450(2). Synthetic image 425 is generated by combining processed source image 423(0) and synthetic image 424(0) through image processing function 450(3).

In one embodiment, source image 422(0) may comprise a digital image captured by digital camera 230 of FIG. 2A under ambient lighting conditions and source image 422(1) comprises a digital image captured by digital camera 230 under flash and ambient lighting conditions. In an alternative embodiment, source image 422(0) may comprise a digital image captured by digital camera 230 according to a first exposure, while source image 422(1) comprises a digital image captured by digital camera according to a second, different exposure. In such an embodiment, source images 422(0) and 422(1) may comprise a two image HDR image stack.

In one embodiment, image processing functions 450(0) and 450(1) may perform, without limitation, color adjustments, resolution adjustments, and formatting adjustments. Image processing function 450(2) may perform an image alignment operation to align processed source image 423(1) with processed source image 423(0) to generate synthetic image 424(0). Image processing function 450(3) may be configured to combine processed source image 423(0) and synthetic image 424(0) based on a viewing parameter, which may be specified by a user through a UI control.

In one embodiment, DIO 410 may include processed source image 423(0) and synthetic image 424(0). A DIO viewer may be configured to perform image processing function 450(3), which may be specified in view of behavior metadata 436, based on the viewing parameter to generate synthetic image 425 for display to the user. In an alternative embodiment, DIO 410 may include processed source images 423(0) and 423(1). The DIO viewer may be configured to perform image processing function 450(2), which may be specified in generation behavior metadata 436, to generate synthetic image 424(0). The DIO viewer may be further configured to perform image processing function 450(3), which may be specified in view behavior metadata 436, based on the viewing parameter to generate synthetic image 425 for display to the user.

In certain embodiments, generating a synthetic image may require a sufficiently large computational load as to preclude real-time generation of the synthetic image in response to the viewing parameter. In such embodiments, one or more synthetic images may be generated once and provided to the DIO viewer for real-time blending operations that may be feasibly performed in real-time. For example, in an embodiment where synthetic image 424(0) comprises an aligned version of processed source image 423(1), the alignment process may be computationally too intense to be computed in real-time as a user adjusts the viewing parameter, but synthetic image 424(0) need only be created once prior to being viewed. Similarly, a synthetic image generated through an HDR merge may be computationally intense to generate, but need only be generated once. Once generated, the HDR image may be blended in real-time through a simpler image processing function 450(3), configured to be responsive in real-time to the viewing parameter.

Figure 4C:
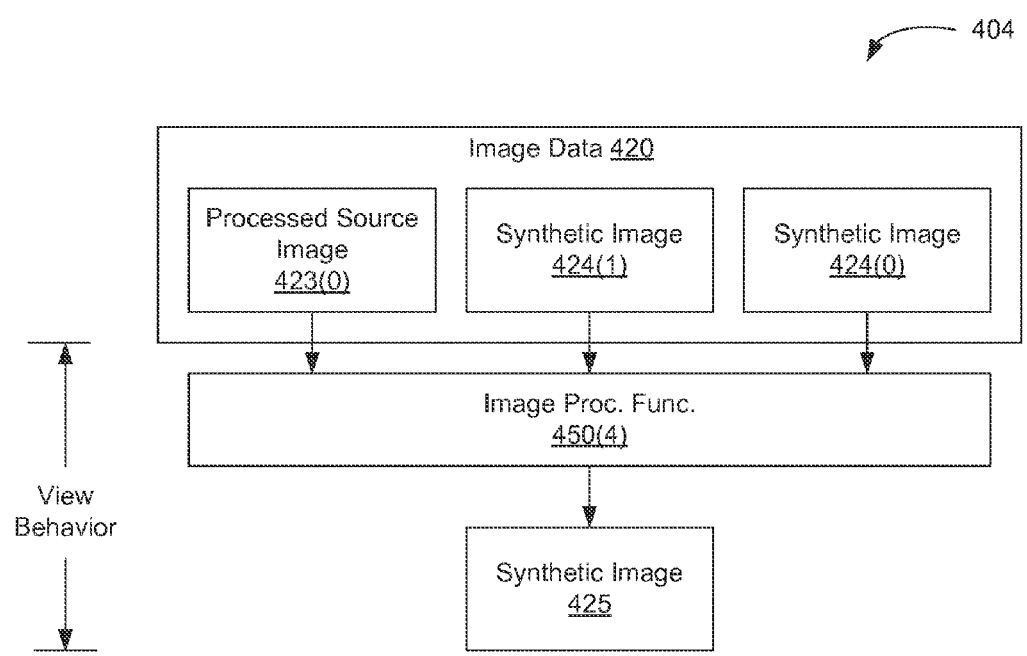
FIG. 4C illustrates a second dataflow process for generating a synthetic image comprising a dynamic image object, according to one embodiment of the present invention.

FIG. 4C illustrates a second dataflow process 404 for generating a synthetic image comprising a dynamic image object, according to one embodiment of the present invention. As shown, an image processing function 450(4), which may be specified in view behavior metadata 436, is configured to generate synthetic image 425 by combining processed source image 423(0), synthetic image 424(1), and synthetic image 424(0).

In one embodiment, image data 420 comprising DIO 410 may include processed source image 423(0), synthetic image 424(1), and synthetic image 424(0). Processed source image 423(0) may be generated based on a source image 422(0), sampled by digital camera 230, using ambient illumination. Synthetic image 424(0) may be generated from a corresponding source image, sampled by digital camera 230, using both ambient illumination and strobe illumination provided by strobe unit 236. Synthetic image 424(0) may be aligned to processed source image 423(0). Additionally, synthetic image 424(1) may be generated by combining processed source image 423(0) and synthetic image 424(0).

In one embodiment, combining processed source image 423(0) and synthetic image 424(0) to generate synthetic image 424(1) may comprise a non-linear blend operation. A pixel pair may comprise one pixel from the processed source image 423(0) and one corresponding pixel from the synthetic image 424(0). The non-linear blend operation may assign a greater blending weight to one or the other pixel in the pixel pair based on relative intensity of the pixels comprising the pixel pair. In an alternative embodiment, combining processed source image 423(0) and synthetic image 424(0) may comprise a linear blend operation, such as an alpha blend operation. A level adjustment operation may be applied to an image resulting from the alpha blend operation. The level adjustment operation may be configured to brighten a certain range of intensity values, darken a range of intensity values, or any combination thereof. In certain embodiments, combining processed source image 423(0) and synthetic image 424 (0) may further comprise adjusting color within synthetic image 424(0) according to color information from processed source image 423(0).

In one embodiment, a DIO viewer may be configured to display a blended image comprising zero through full weight contributions from processed source image 423(0), synthetic image 424(1), and synthetic image 424(0). In one embodiment, the DIO viewer may be configured to execute image processing function 450(4) to generate synthetic image 425 for display. Image processing function 450(4) may implement any technically feasible blend function, such as an alpha blend, whereby the viewing parameter may determine an alpha value for each of three images comprising processed source image 423(0), synthetic image 424(1), and synthetic image 424(0). The three images may be conceptually layered, so that the top image may be essentially copied to synthetic image 425 when the top image has an alpha of one. In one embodiment, if the top image is transparent (alpha is zero), and the middle image has an alpha of one, then the middle image may be essentially copied to the synthetic image 425. The bottom image may be assigned an alpha of one. In another embodiment, each alpha value for each image may be calculated from the viewing parameter, which may be generated from a UI control, such as a linear control. When the viewing parameter is assigned one extreme value (such as from a fully left position of the UI control), both the top image and the middle image may be assigned an alpha of zero, giving the bottom image full weight in synthetic image 425. When the viewing parameter is assigned an opposite extreme value (such as from a fully right position of the UI control), the top image may be assigned an alpha of one. When the viewing parameter is assigned a mid-point value (such as from a mid position of the UI control), the middle image may be assigned an alpha of one (opaque) and the top image may be assigned an alpha of zero (transparent).

Figure 5A:
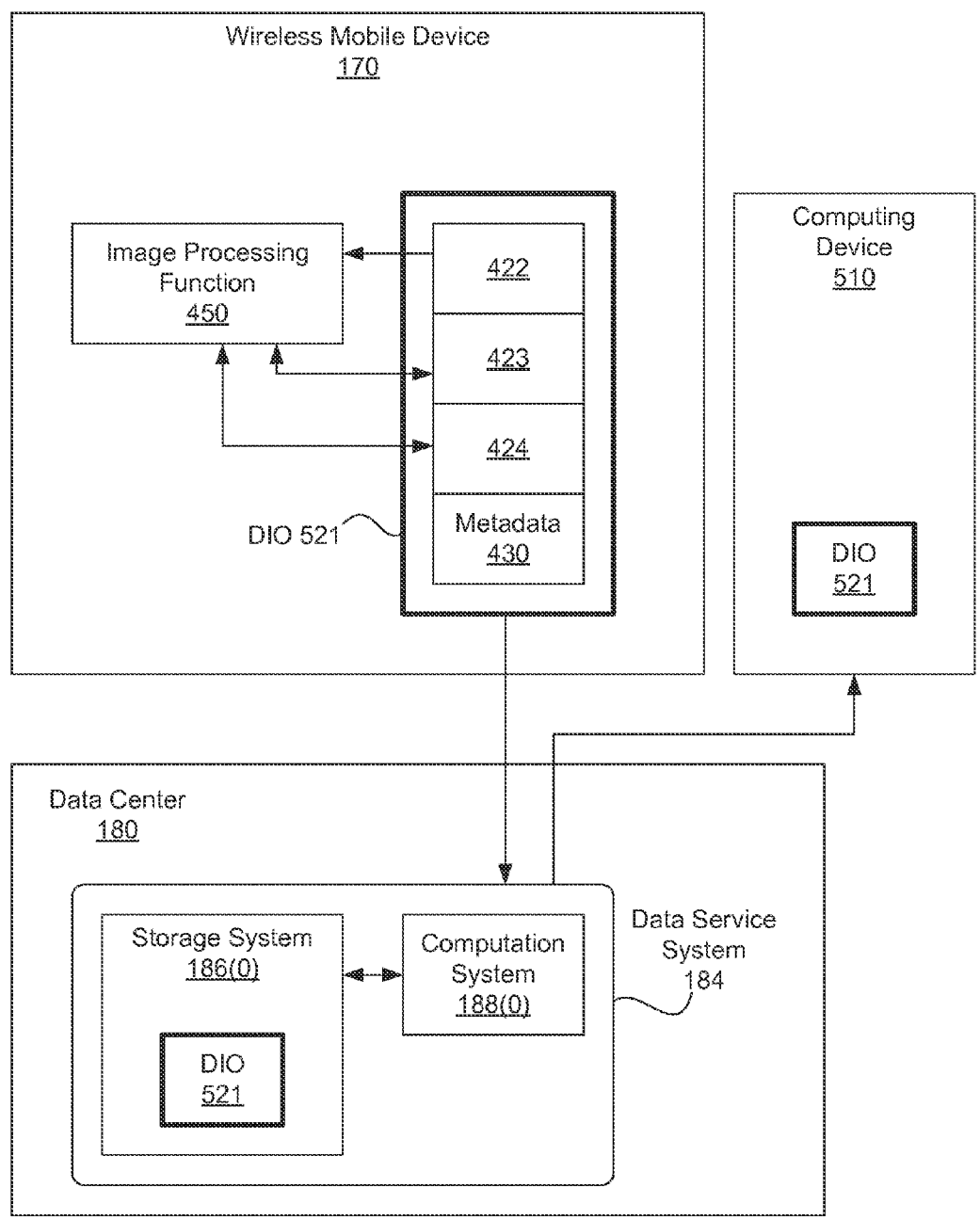
FIG. 5A illustrates a wireless mobile device configured to generate and transmit a dynamic image object to a data service system, according to one embodiment of the present invention.

FIG. 5A illustrates wireless mobile device 170 configured to generate and transmit a DIO 521 to a data service system 184, according to one embodiment of the present invention. DIO 521 comprises an instance of a data structure that substantially conforms to DIO 410 of FIG. 4A. As shown, image processing function 450 may generate one or more processed source images 423, one or more synthetic images 424, or any combination thereof, based on one or more source images 422. Image processing function 450 may be specified by generation behavior metadata 438 within metadata 430. Image processing function 450 may be specified explicitly, such as by programming instructions, or implicitly, such as by a reference to a predefined set of image processing functions.

Wireless mobile device 170 may be configured to compute the one or more processed source images 423, the one or more synthetic images 424, or any combination thereof, to populate DIO 521. In certain configurations, DIO 521 may include a minimum set of images needed by a DIO viewer to generate a synthetic image for display, such as synthetic image 425 of FIG. 4C. In one embodiment, the DIO viewer may be configured to generate one or more synthetic images based on generation behavior metadata 438, and to generate the synthetic image for display based on view behavior metadata 436.

After DIO 521 has been populated with an appropriate set of images, wireless mobile device 170 may transmit the DIO 521 to the data service system 184, comprising any technically feasible computing system, such as a server executing within a virtual machine. Data service system 184 may be configured to share DIO 521 with a computing device 510, which may comprise any technically feasible computing platform such as a smartphone, a tablet computer, a laptop computer, or a desktop computer, or a server computer system. Such sharing may be directed by a user operating wireless mobile device 170, which serves as a sharing source, while computing device 510 serves as a sharing target. Sharing may be performed asynchronously, whereby wireless mobile device 170 may transmit DIO 521 to data service system 184 for sharing at one time, while computing device 510 may retrieve the DIO 521 at some later point in time.

In one embodiment, application program 270 of FIG. 2D may be configured to generate and share DIO 521. In such an embodiment, the application program 270 may be configured to transmit DIO 521 to data service system 184. The application program 270 may also be configured to execute image processing function 450 to generate synthetic image 424 within DIO 521, and to further generate a synthetic image for display within wireless mobile device 170. In certain embodiments, a user may select among predefined image processing functions to designate which image processing function or combination of functions should be executed as image processing function 450. A UI tool may be configured to present the predefined image processing functions and allow a user to select among the functions. The UI tool may define a menu system, a searchable library system, or any other technically feasible selection technique. Application program 270 may implement a DIO viewer for viewing DIO 521 within mobile device 170.

In certain embodiments, a DIO viewer (not shown) executing within computing device 510 may be configured to execute certain image processing functions 450, specified within metadata 430 to generate a local copy of one or more synthetic image 424. In such an embodiment, synthetic image 424 need not be populated within DIO 521. Computing synthetic image 424 locally within computing device 510 may advantageously reduce transmission time and net data transmitted between wireless mobile device 170 and data service system 184, as well as between data service system 184 and computing device 510. In other embodiments, the DIO viewer may be configured to receive processed source images 423 and generate all downstream synthetic images locally, potentially reducing transmission time and total transmitted data between wireless mobile device 170 and computing device 510.

Figure 5B:
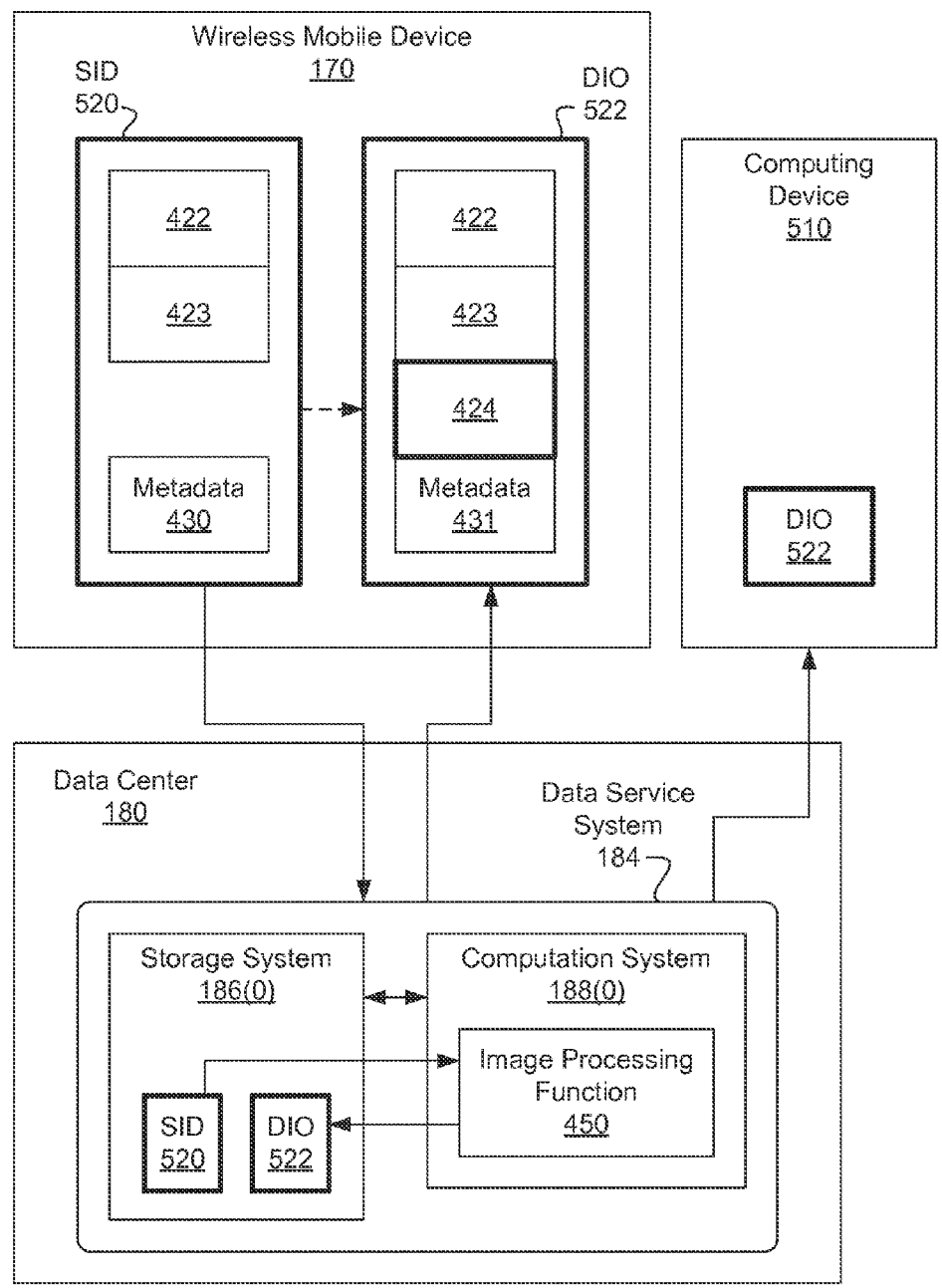
FIG. 5B illustrates a data service system configured to generate a synthetic image associated with a dynamic image object, according to one embodiment of the present invention.

FIG. 5B illustrates data service system 184 configured to generate a synthetic image 424 associated with a DIO 522, according to one embodiment of the present invention. DIO 522 comprises an instance of a data structure that substantially conforms to DIO 410 of FIG. 4A. As shown, a data set comprising source image data (SID) 520 residing within wireless mobile device 170 is transmitted to data service system 184.

In one embodiment, SID 520 may be structured as a subset of a DIO 410 of FIG. 4A, and may include at least one source image 422 and metadata 430. In certain embodiments, SID 520 may include one or more processed source images 423 and metadata 430. Data service system 184 may store SID 520 within a storage system, such as storage system 186(0). Computation system 188(0) may execute image processing function 450 on SID 520 to generate DIO 522, comprising at least one synthetic image 424, based on SID 520.

In one embodiment, data processing function 450 may be specified within metadata 430 of SID 520. In certain embodiments, metadata 430 may specify references to image processing functions implemented within computation system 188(0). In other embodiments, metadata 430 may specify programming instructions that define image processing function 450. In an alternative embodiment, data processing function 450 may be specified by an application program (not shown) that may be associated with computation system 188(0) and configured to execute image processing function 450.

In one embodiment, data service system 184 may transmit DIO 522 to wireless mobile device 170. Metadata 431 may include at least a portion of metadata 430, as well as any additional metadata generated by computation system 188(0), such as metadata generated by image processing function 450. In an alternative embodiment, data service system 184 may transmit synthetic image 424 to wireless mobile device 170, which may assemble a local copy of DIO 522 from SID 520 and synthetic image 424. Data service system 184 may transmit metadata 431 or differences between metadata 430 and metadata 431 to wireless mobile device 170 for incorporation within DIO 522. Data service system 184 may share DIO 522 with a computing device 510. Such sharing may be directed by a user operating wireless mobile device 170. DIO 522 may include a substantially minimum set of images needed by a DIO viewer. DIO 522 may instead include a set of images needed by the DIO viewer to generate a display image while applying a substantially minimum computation effort.

Figure 5C:
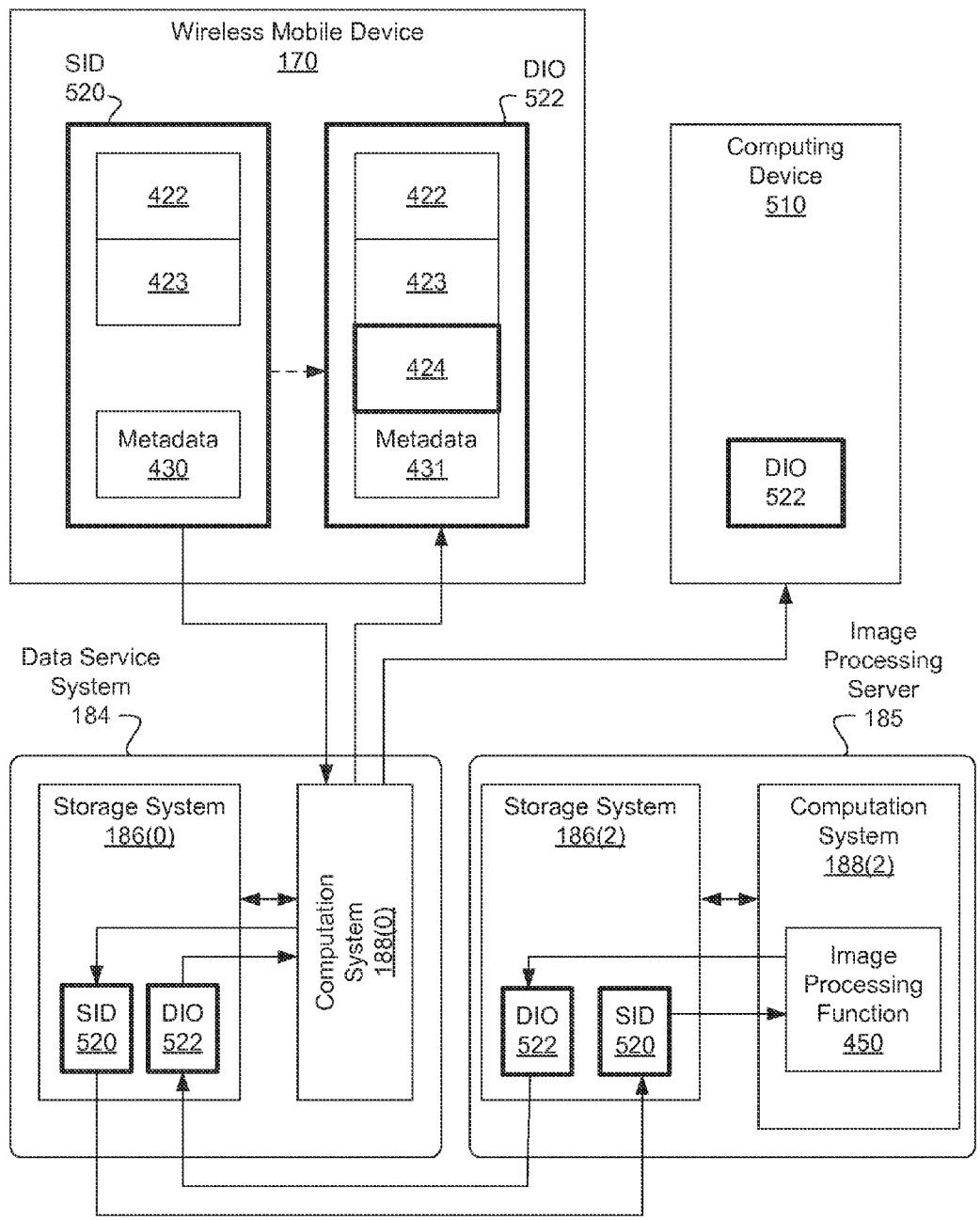
FIG. 5C illustrates an image processing server configured to generate a synthetic image associated with a dynamic image object, according to one embodiment of the present invention.

FIG. 5C illustrates an image processing server 185 configured to generate a synthetic image 424 associated with DIO 522, according to one embodiment of the present invention. As shown, wireless mobile device 170 transmits SID 520 to data service system 184. Data service system 184 stores SID 520 within a storage system, such as storage system 186(0). Data service system 184 then transmits SID 520 to image processing server 185, which stores SID 520 within a storage system, such as storage system 186(2).

Computation system 188(2) may execute image processing function 450 on images comprising SID 520 to generate a synthetic image 424 comprising DIO 522. In one embodiment, data processing function 450 may be specified within metadata 430. In certain embodiments, metadata 430 may specify references to image processing functions implemented within computation system 188(2). In other embodiments, metadata 430 may specify programming instructions that define image processing function 450. In an alternative embodiment, data processing function 450 may be specified by an application program (not shown) that is associated with computation system 188(2) and configured to execute image processing function 450. Image processing server 185 may transmit DIO 522 to data service system 184, which may store DIO 522, such as within storage system 186(0).

In one embodiment, data service system 184 may transmit DIO 522 to wireless mobile device 170. In an alternative embodiment, data service system 184 may transmit the synthetic image 424 to wireless mobile device 170, which may assemble a local copy of DIO 522 from SID 520 and synthetic image 424. Data service system 184 may share DIO 522 with a computing device 510. Such sharing may be directed by a user operating wireless mobile device 170. In one embodiment, data service system 184 may provide a web API that enables image processing server 185 to access SID 520 and to store DIO 522 within data service system 184. In certain embodiments, storage system 186(2) may comprise system memory, such as system memory residing within computation system 188(2). In one embodiment, each SID 520 and each DIO 522 may be stored temporarily until DIO 522 is transmitted to data service system 184 for storage therein.

In another embodiment, each SID 520 and each DIO 522 may be stored within data service system 184 and may be associated with a specific account, such as a user account, which may be further associated with wireless mobile device 170. For example, in one embodiment, a user account may be used to organize which SID 520 and DIO 522 object(s) are associated with the user. The user account may further associate the user with a cellular services account, which may be distinct from the user account. Of course, in other embodiments, any technically feasible authentication technique may be implemented to authenticate a particular user and authorize the user to access the account.

In one embodiment, data services system 184 may be configured to generate a usage record (not shown) that reflects how many DIOs were generated for a given user account. The usage record may be stored in storage system 186(0). The usage record may reflect which system, such as data service system 184 or image processing server 185, generated a given DIO. Alternatively, in another embodiment, the usage record may reflect a net count of generated DIOs generated per system. Each system may maintain an independent usage record; for example, image processing server 185 may maintain a usage record of how many DIOs it generated for a given user account. In certain embodiments, the usage record may be used by a customer billing system. In this way, the usage record may facilitate fee-based image-processing services. The fees may be billed through a cellular service agreement or separately to an unrelated user account. Of course, in other embodiments, any technically feasible billing system may be configured to read the usage record and generate account invoices based on the usage record.

One or more usage records may enable a commercial ecosystem to develop, whereby one or more third parties may operate an image processing server 185. A given image processing server 185 may be configured to implement proprietary image processing functions 150, which may be commercially availed to a user operating wireless mobile device 170. One example of a proprietary image processing function may be an HDR image processing function, which may be computationally too intense for wireless mobile device 170. Another example of a proprietary image processing function may be an image analysis and recognition function that may require a proprietary database of image data that may not be stored on wireless mobile device 170.

Figure 6A:
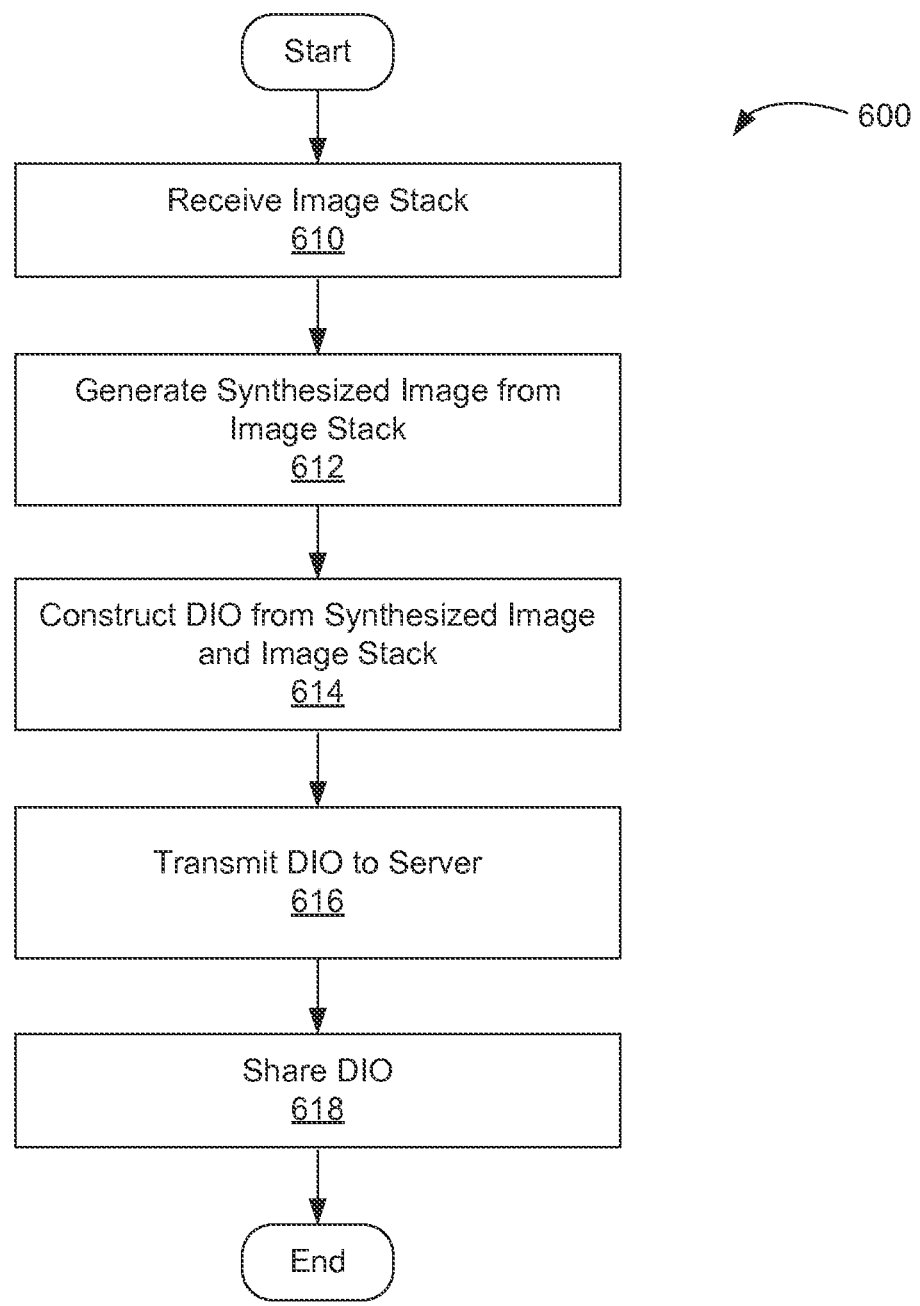
FIG. 6A is a flow diagram of method steps for sharing a dynamic image object generated by a client device, according to one embodiment of the present invention.

FIG. 6A is a flow diagram of a method 600 for sharing a DIO generated by a client device, according to one embodiment of the present invention. Although method 600 is described in conjunction with the systems of Figures IC-3C and FIG. 5A, persons skilled in the art will understand that any system configured to perform the method steps is within the scope of the present invention. The DIO may comprise DIO 521 of FIG. 5A.

Method 600 begins in step 610, where an application program may receive an image stack, comprising one or more images, such as source images 422 of FIG. 4A or processed source images 423. In one embodiment, the application program may comprise application program 270 of FIG. 2D, configured to execute within processor complex 210 of FIG. 2C. In step 612, the application program may generate a synthesized image, such as synthesized image 424. The application program may also generate one or more processed source images, such as a processed source image 423. In step 614, the application program may construct the DIO based on at least the synthesized image. In step 616, the application program may transmit the DIO to a server, such as data service system 184 of FIG. 5A.

In step 618, the application program may share the DIO. In one embodiment, sharing the DIO may comprise the application program instructing the server to share the DIO. In an alternative embodiment, the application program may share the DIO by transmitting the DIO to a peer application executing on a different device. In another alternative embodiment, sharing the DIO may be implied as a consequence of the application program transmitting the DIO to the server. As discussed previously, the process of sharing a DIO may include multiple steps, with each step conducted at different, asynchronous points in time.

Figure 6B:
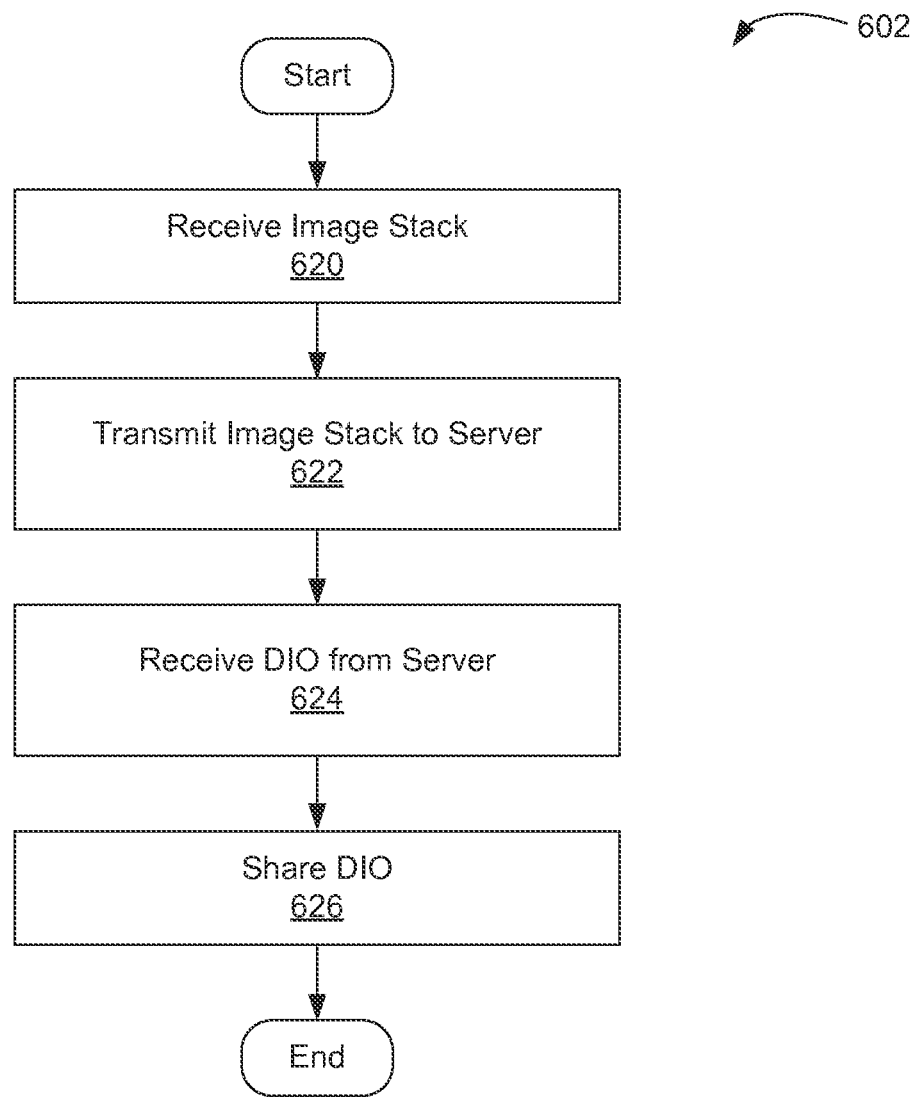
FIG. 6B is a flow diagram of method steps for sharing a dynamic image object generated by a data service system, according to one embodiment of the present invention.

FIG. 6B is a flow diagram of a method 602 for sharing a DIO, such as DIO 522 of FIGS. 5B, 5C, generated by a data service system, according to one embodiment of the present invention. Although method 602 is described in conjunction with the systems of FIGS. 1C-3C and FIGS. 5B-5C, persons skilled in the art will understand that any system configured to perform the method steps is within the scope of the present invention.

Method 602 begins in step 620, where an application program receives an image stack, such as SID 520 of FIGS. 5B and 5C, comprising one or more images. In one embodiment, the application program may comprise application program 270 of FIG. 2D, configured to execute within processor complex 210 of FIG. 2C. In step 622, the application program may transmit the image stack to a server, such as data service system 184. In step 624, the application program may receive a DIO, such as DIO 522, from the server. In one embodiment, the DIO may include at least one synthetic image 424. The application program may assemble a local copy of the DIO to include the at least one synthetic image 424. In step 626, the application program may share the DIO, as described above in step 618 of FIG. 6A.

Figure 7A:
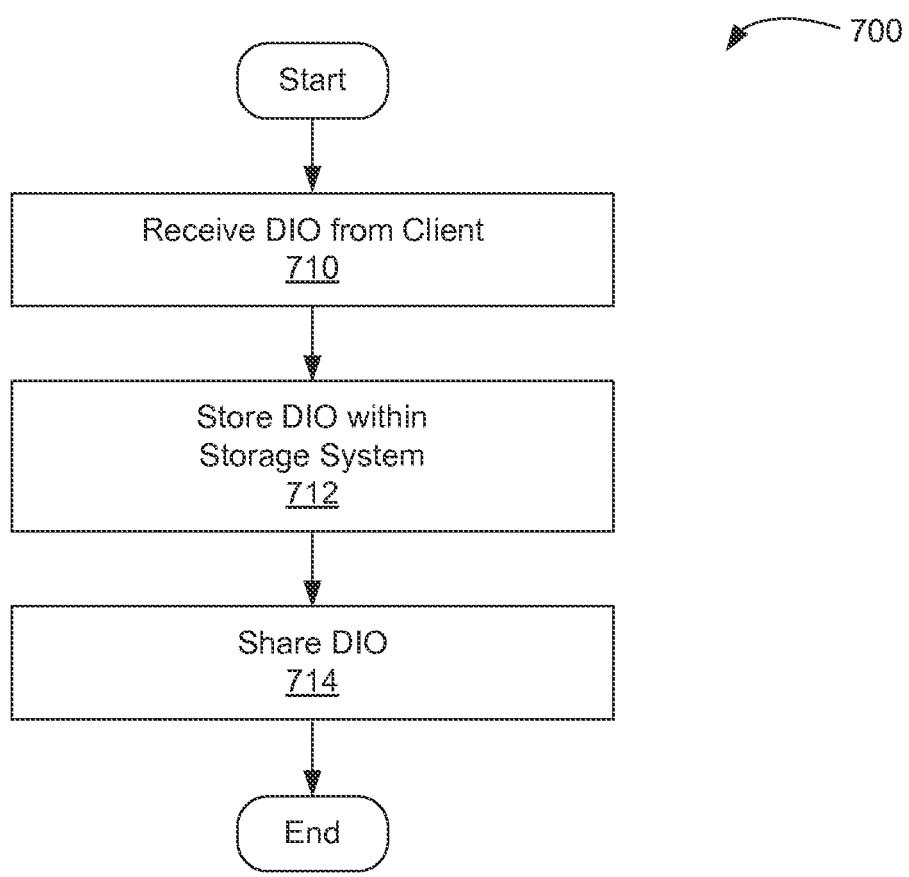
FIG. 7A is flow diagram of method steps, performed by a data service system, for sharing a dynamic image object generated by a client device, according to one embodiment of the present invention.

FIG. 7A is flow diagram of a method 700, performed by a data service system, for sharing a DIO generated by a client device, according to one embodiment of the present invention. Although method 700 is described in conjunction with the systems of FIGS. 1C-3C and FIG. 5A, persons skilled in the art will understand that any system configured to perform the method steps is within the scope of the present invention. In one embodiment, the data service system may comprise data service system 184 of FIG. 5A, the DIO may comprise DIO 521, and the client device may comprise wireless mobile device 170.

Method 700 begins in step 710, where the data service system receives a DIO from the client device. In step 712, the data service system may store the DIO within a storage system, such as storage system 186(0). In step 714, the data service system may share the DIO, thereby enabling a sharing target, such as computing device 510, to access the DIO. The sharing target may display the DIO to a sharing user through a DIO viewer. In one embodiment sharing the DIO may be initiated by the client device implicitly with the transmission of the DIO to the data service system 184. In an alternative embodiment, sharing the DIO may be initiated explicitly by the client device. For example, in one embodiment, the client device may store multiple DIOs within the data service system 184, but only share selected DIOs by explicitly indicating to the data service system 184 which DIOs need to be shared. In one embodiment, sharing the DIO may comprise updating an associated web page that may be accessed by a sharing target. In another embodiment, sharing may comprise generating an update event through a web API that is being accessed by the sharing target. In yet another embodiment, sharing may comprise transmitting a universal resource locator (URL) to the sharing target. In still yet another embodiment, sharing may comprise transmitting the DIO to the sharing target.

Figure 7B:
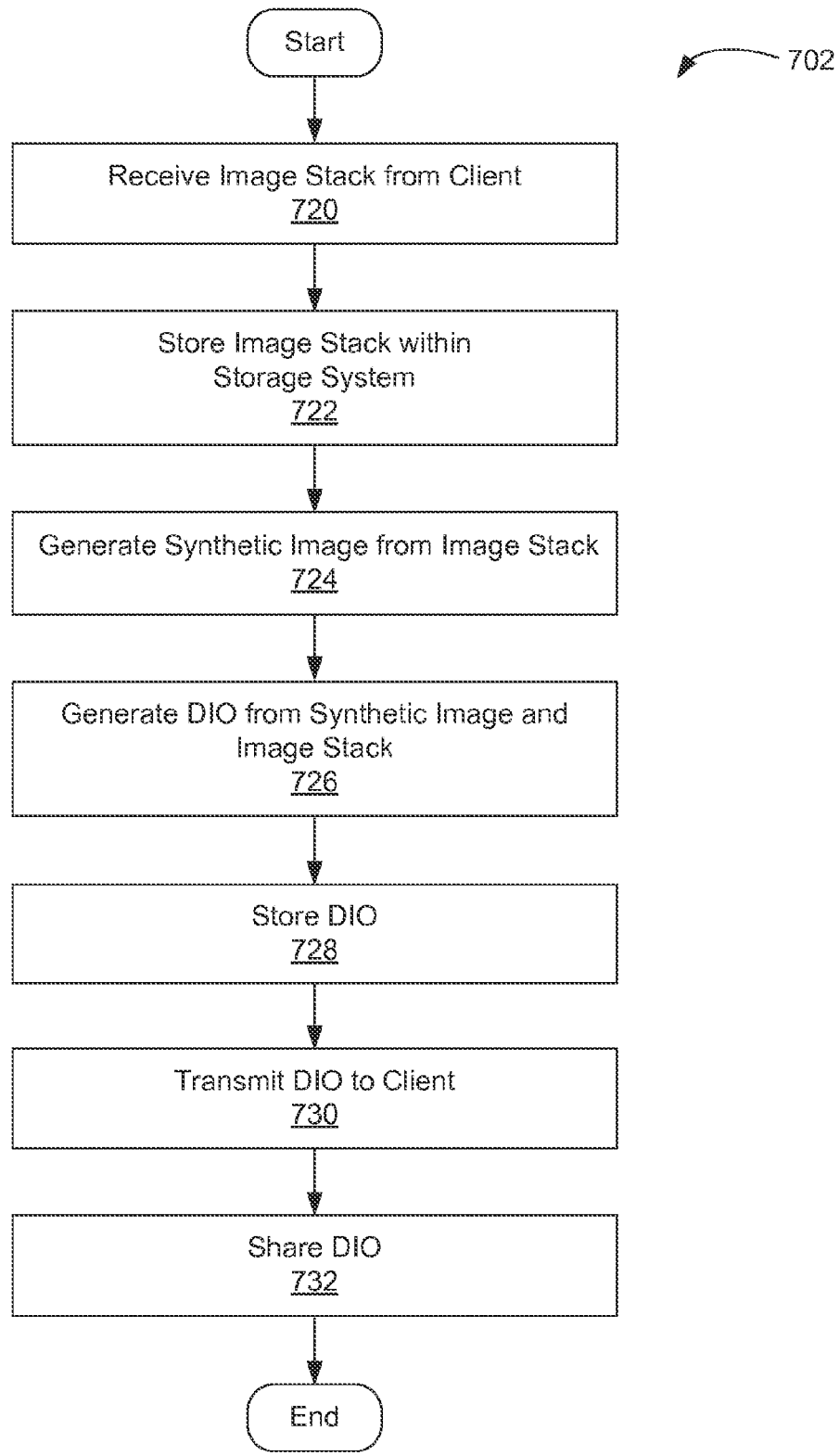
FIG. 7B is a flow diagram of method steps, performed by a data service system, for generating and sharing a dynamic image object, according to one embodiment of the present invention.

FIG. 7B is a flow diagram of a method 702, performed by a data service system, for generating and sharing a DIO, according to one embodiment of the present invention. Although method 702 is described in conjunction with the systems of FIGS. 1C-3C and FIG. 5B, persons skilled in the art will understand that any system configured to perform the method steps is within the scope of the present invention. In one embodiment, the data service system may comprise data service system 184 of FIG. 5B, the DIO may comprise DIO 522, an image stack may comprise SID 520, and wireless mobile device 170 may comprise a client device.

Method 702 begins in step 720, where the data service system receives an image stack from the client device. In step 722, the data service system may store the image stack within a storage system, such as storage system 186(0). In step 724, the data service system may generate a synthetic image, such as synthetic image 424 within DIO 522. The synthetic image may be based substantially on images within the image stack. The data service system may also generate metadata 431 associated with the synthetic image 424. In step 726, the data service system may generate the DIO from the synthetic image and the image stack. In step 728, the data service system may store the DIO in the storage system. In step 730, the data service system may transmit the DIO to the client device. As discussed previously, transmitting the DIO to the client device may involve transmitting the whole DIO or just synthetic images comprising the DIO needed to reconstruct a local copy of the DIO within the client device. In step 732, the data service system may share the DIO with a sharing target, such as computing device 510.

In one embodiment, generating the synthetic image in step 724 may further include generating a record of usage per user, so that each generated synthetic image may be counted. The record may then be coupled to a billing system configured to accrue usage charges to a user account associated with the client device. In one embodiment, the user may be provided with a selection of different image processing services, each configured to generate the synthesized image according to a selected image processing function. In one embodiment, each different image processing service may accrue different usage charges.

Figure 7C:
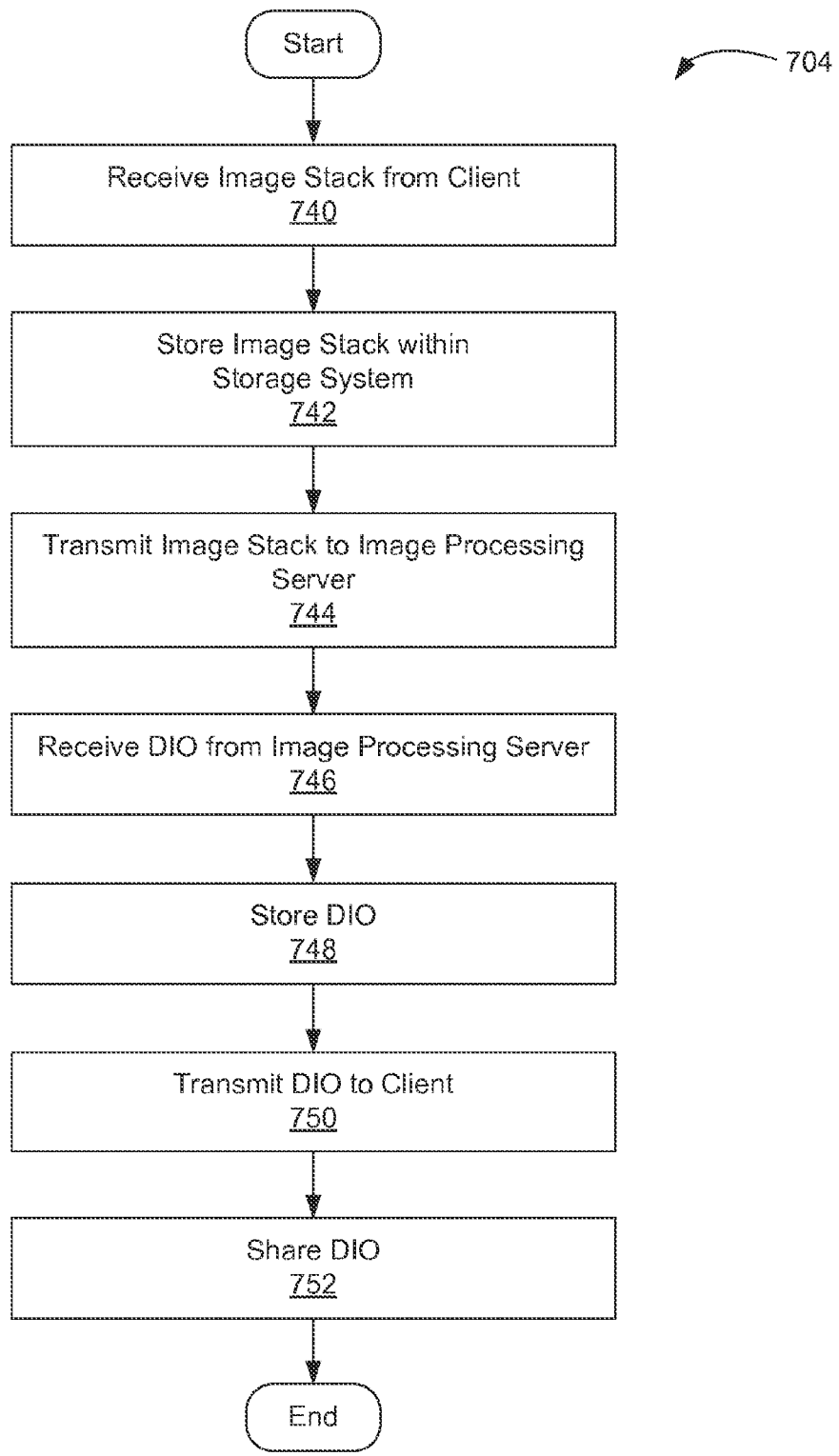
FIG. 7C is a flow diagram of method steps, performed by a data service system, for sharing a dynamic image object generated by an image processing server, according to one embodiment of the present invention.

FIG. 7C is a flow diagram of a method 704, performed by a data service system, for sharing a DIO generated by an image processing server, according to one embodiment of the present invention. Although method 704 is described in conjunction with the systems of FIGS. 1C-3C and FIG. 5C, persons skilled in the art will understand that any system configured to perform the method steps is within the scope of the present invention. In one embodiment, the data service system may comprise data service system 184 of FIG. 5C, the DIO may comprise DIO 522, an image stack may comprise SID 520, and wireless mobile device 170 may comprise a client device.

Method 704 begins in step 740, where the data service system receives an image stack from the client device. In step 742, the data service system may store the image stack within a storage system, such as storage system 186(0). In step 744, the data service system may transmit the image stack to an image processing server, such as image processing server 185. The image processing server may be configured to generate a synthetic image, such as synthetic image 424, which may be stored within DIO 522. In step 746, the data service system may receive the DIO from the image processing server. In step 748, the data service system may store the DIO in the storage system. In step 750, the data service system may transmit the DIO to the client device. In step 752, the data service system may share the DIO with a sharing target, such as computing device 510.

Figure 8:
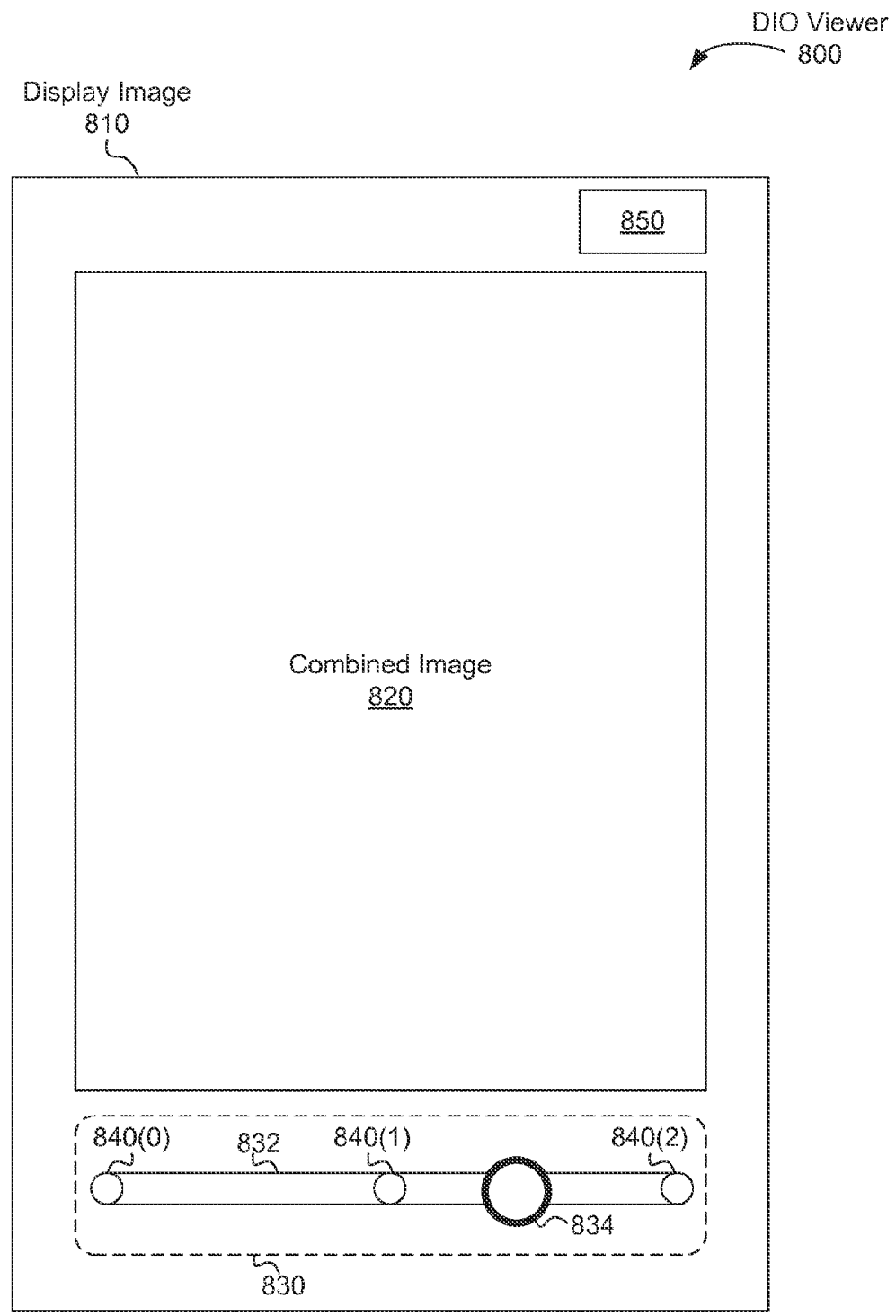
FIG. 8 illustrates a dynamic image object viewer, according to one embodiment of the present invention.

FIG. 8 illustrates a DIO viewer 800, according to one embodiment of the present invention. DIO viewer 800 may be configured to provide an interactive user experience for viewing a DIO, such as DIO 410 of FIG. 4A.

In various embodiments, DIO viewer 800 may include a UI control 830, configured to enable a user to enter a viewing parameter, which may be depicted as a position of a control knob 834 along a slide path 832. To change the viewing parameter, the user may move control knob 834. In a touch screen implementation, moving the control knob may involve the user touching and sliding the control knob. The control knob may remain in position after the user lifts their finger from the touch screen. In implementations based on a mouse or track pad, the user may click on and drag the control knob. A combined image 820 may be generated based on two or more images associated with the DIO, and further based on the viewing parameter. The viewing parameter may change as the user slides the control knob 834, creating a sequence of corresponding new viewing parameters. In one embodiment, the DIO viewer 800 may be configured to generate a new combined image 820 based on the sequence of new viewing parameters. In this way, the user may touch and hold their finger to the control knob 834, and see changes to the combined image 820 in real-time as they slide the control knob 834 along the slide path 832.

In one embodiment, details for how the combined image 820 should be generated may be specified in view behavior metadata, such as view behavior metadata 436, associated with the DIO 410. In another embodiment, each of the two or more images that contribute to combined image 820 may be associated with a corresponding anchor point 840 along the slide path 832. An association between each one of the two or more images and a corresponding anchor point may be specified within the metadata. An order of the two or more images may be specified within the metadata. A position for each anchor point 840 may be specified within the metadata, along with an association between each anchor point 840 and one image within the DIO 410. The one image may comprise one of a source image 422, a processed source image 423, or a synthetic image 424 within the DIO 410.

In one embodiment, the metadata may include information related to the control knob 834, such as an initial position for control knob 834. In one embodiment, the initial position may be established by a user while viewing a DIO within DIO viewer 800. When the user closes the DIO, the DIO viewer 800 may save the current position as the initial position when the DIO is next opened. The initial position may also be established based on a suggested position for the control knob 834. The suggested position may be computed by substantially optimizing a cost function associated with the combined image 820, such as an exposure function, color correctness function, histogram function, contrast function, or any other cost function that may be computed from the combined image 820. The suggested position may be saved to the DIO when the DIO is initially generated. In one embodiment, the suggested position is displayed as a marker, even if the user changes the position of the control knob 834 to establish a different initial position.

In certain embodiments, the control knob 834 may be animated to slide along slide path 832 as an indication to the user that the control knob 834 may be moved and to further indicated to the user what effect moving the control knob 834 has on a resulting combined image 820. For example, in one embodiment, the control knob 834 may be displayed in an initial position, and then slide to a left extreme, and then slide to a right extreme, and then slide back to the initial position, completing the animation. Alternatively, in a separate embodiment, the control knob 834 may be displayed at the left extreme, and then slide to the right extreme, and then slide to the initial position, completing the animation. As the control knob 834 is animated along slider path 832, combined image 820 may be updated to reflect a current position for the control knob 834. In one embodiment, the metadata may further include animation information, such as the extreme left position and extreme right position along slide path 832, how many animation cycles should be performed, animation velocity for the control knob 834, granularity of animation along slide path 832, and the like.

In some embodiments, the animation may be performed each time the user initially opens a particular DIO within the DIO viewer 800. The animation of control knob 834 may enable a new user to quickly learn to use the control knob 834 within the DIO viewer 800, and any user may be provided a quick, visual understanding of the extent of visual impact the control knob 834 may have on a current DIO being presented to them.

DIO viewer 800 may process the metadata, such as by compiling or instantiating an OpenGL shader program used to generate combined image 820. Alternatively, DIO viewer 800 may invoke a compositing function or other shader program function that may be built into DIO viewer 800 and distinct from the DIO. In one embodiment, the compositing function may implement alpha (opacity) blending to generate combined image 820 based on the two or more images, and further based on an alpha value substantially determined by the viewing parameter.

In one embodiment, shown here, anchor point 840(0) may correspond to one image from the DIO, anchor point 840(1) may correspond to a second image from the DIO, and anchor point 840(2) may correspond to a third image from the DIO. The first image may be conceptually behind the second image, and the second image may be conceptually behind the third image. When control knob 834 is positioned at anchor point 840(0), combined image 820 may substantially represent the first image. In this position, the first image may be completely opaque, while the second image may be fully transparent, and the third image may be functionally fully transparent.

In another embodiment, when control knob 834 is positioned at anchor point 840(1), combined image 820 may substantially represent the second image. In this position, the second image may be fully opaque and the third image may be fully transparent. When control knob is positioned between anchor points 840(0) and 840(1), combined image 820 may represent a linear composition of the first image and the second image. In this position, the third image may be functionally fully transparent. The linear composition may be generated using conventional alpha-blending technique. The third image may be fully transparent while control knob 834 is positioned within the inclusive range between anchor points 840(0) and 840(1), or the third image may be excluded from computing combined image 820 when control knob 834 is within this range. As control knob 834 moves from anchor point 840(1) to 840(2), the third image may be composited with proportionally increasing opacity (decreasing transparency).

While such an embodiment may implement a basic alpha blend operation for generating combined image 820, different functions may be implemented for generating combined image 820 without departing the scope and spirit of embodiments of the present invention. Furthermore, programming instructions specified within the metadata may define specific functions for generating combined image 820 based on two or more images within the DIO, and further based on the viewing parameter derived from a position of control knob 834. For example, in one embodiment, the position of control knob 834 may have a nonlinear relationship with a viewing parameter controlling the generation of combined image 820. In certain embodiments, more than one UI control may be implemented to provide corresponding viewing parameters.

In one embodiment, DIO viewer 800 may be configured to generate a synthetic image, such as synthetic image 424 prior to presenting a combined image 820 to the user. In such an embodiment, DIO viewer 800 may load source images, such as source images 422, processed source images 423, or any combination thereof comprising the DIO and may generate one or more synthetic images 424 associated with the DIO. DIO viewer 800 may generate the one or more synthetic images based on the metadata or based on a predetermined image processing function. In one embodiment, the image processing function may receive a parameter from a user, such as through a UI control.

In one embodiment, DIO viewer 800 may be implemented as a software application, such as application program 270 of FIG. 2D, executing on a computation platform, such as wireless mobile device 170. A display image 810 comprising the combined image and the UI control 830 may be generated on display unit 212 of FIG. 2C.

In another embodiment, DIO viewer 800 may be implemented as a control script executing as dynamic behavior associated with a web page. Here, at least one source image and at least one synthetic image may be loaded in conjunction with loading the web page, and a local compositing function may generate the combined image 820.

In one embodiment, DIO viewer 800 may present a UI control, such as a share button 850, within display image 810. When the user indicates that a DIO should be shared, such as by pressing the share button 850, the DIO may be shared, as described previously. The DIO may be shared in conjunction with a particular user account. In one embodiment, a given DIO may reside within wireless mobile device 170, and pressing the share button 850 may cause the wireless mobile device 170 to transmit the DIO to a data service system, such as data service system 184; alternatively, pressing the share button 850 may cause the wireless mobile device 170 to transmit the DIO to a sharing target, such as computing device 510 of FIG. 5A.

In an alternative embodiment, a given DIO may reside within the data service system, and pressing the share button 850 while viewing the DIO within DIO viewer 800 may cause the data service system to avail the DIO to other users who may have access to DIOs associated with the user account. For example, in one embodiment, the DIO viewer 800 may transmit a command to the data service system to avail the DIO to other users. The command may identify a specific DIO through any technically feasible identifier such as an unique number or name, to other users.

In one embodiment, an application program that implements a UI control is configured to illustrate a corresponding effect of the UI control through a sequence of frames comprising a control animation. The control animation may illustrate any technically feasible function for the UI control. The animation sequence may be executed when a particular application view is first presented. The animation sequence may also be executed when a particular control is made active. For example, in mobile devices with limited screen space, an application program may allow the user to have one or a small number of UI controls active at any one time and to select among different UI controls to be made active. When the user selects a particular UI control, the application program may animate the UI control to illustrate to the user what effect the UI control has within the application program. This technique may be practiced for any type of function associated with any type of application program, the DIO viewer 800 providing one exemplary implementation of this technique. Embodiments of the present invention therefore enable any application program that provides a real-time UI control to advantageously indicate the effect of the UI control to a user by animating the control while displaying a corresponding effect.

In one embodiment of the DIO viewer 800, a "camera roll" may implement a collection of DIOs that may be browsed by a user and selected for display by the DIO viewer 800. In one embodiment, an input gesture, such as a horizontal swipe gesture, causes the DIO viewer 800 to display a different DIO within the camera roll. Each DIO within the camera roll may be assigned a position within a sequence of DIOs comprising the camera roll, and a left swipe may select a subsequent DIO for display in the sequence, while a right swipe may select a previous DIO for display in the sequence. Once a DIO is selected for display, the DIO viewer 800 may display the DIO. The DIO viewer 800 may then animate control knob 834 in conjunction with displaying the DIO. The DIO viewer 800 may further allow the user to move the control knob 834 to adjust combined image 820. Additionally, the DIO viewer 800 may allow the user to share a DIO, such as by pressing the share button 850.

In one embodiment, a camera application may implement a camera view and a DIO view, comprising a DIO viewer 800. When a user is framing their picture, the camera application may display a live preview of the picture. When the user takes their picture, the camera application may generate a DIO from their picture. Upon generating the DIO, the camera application may transition to a view display, implemented as DIO viewer 800. The user may view their image as a DIO within the DIO viewer 800. If the user then enters a swipe gesture, the camera application may select an adjacent DIO within the camera roll for display within the DIO viewer 800.

In another embodiment, a DIO viewer may be embedded within a webpage. For example, in one embodiment, a package of viewing elements may be sent to a client station, the viewing elements including metadata associated with the photos, the one or more images necessary to construct the HDR image, and code for modifying the resulting image based on input from a user. In one embodiment, the code may use in some manner webGL to enable manipulation of the images (e.g. blending of the two or more images, etc.).

In one embodiment, a user may receive additional features on the webpage based on a level of access. For example, in one embodiment, a user may have a premium service wherein additional features associated with the webpage are presented to the user, including the ability to modify the exposure, ambient light, strobe (e.g. flash, etc.) light, blending of the two or more images, brightness, contrast, saturation, color scheme, and/or any other element which may be separately controlled.

Still yet, in one embodiment, the bandwidth associated with a user may control the user's ability to interact with the webpage. For example, in one embodiment, the greater the bandwidth associated with the user, the greater the number of options and/or features presented to the user.

Of course, in other embodiments, if a user does not have a premium account (e.g. the user only has a limited or free account, etc.), then limited access to the features and/or options may be presented. For example, in one embodiment, a user using a free account may have the ability to control the blending of the two or more images but lack the ability to separately control any other element. In some embodiments, the free account may be associated with any control and/or feature.

In one embodiment, the client side interaction associated with the DIO includes the ability to package up the image data, metadata, and then transmit such information to a central server. In one embodiment, the server side interaction may include receiving a DIO package (e.g. including the image data, metadata, etc.), and rendering the package according to the functions and parameters specified. Of course, in other embodiments, the server may take any further actions on the DIO package including recognition of objects within the image, determination of locations or information based on the objects within the image, and/or perform any other action which may be relevant to the DIO package.

In some embodiments, the DIO package rendered by the server may be used as the basis for creating a webpage including a DIO viewer. In other embodiments, the DIO viewer may be integrated (or embedded) within a social network (or any other webpage or network system) including manipulation of resulting images, such as HDR images. In one embodiment, the social network may be used to store any amount of data associated with the DIO viewer, including the initial image data, metadata, rendering instructions, processing code, resulting image, and/or any other data associated with the DIO viewer. In other embodiments, the storing of any data associated with the DIO may occur on a temporary basis (e.g. sharing of the DIO viewer is limited to only one week, etc.) or may be on an indefinite or undefined basis as well.

In another embodiment, the metadata which is initially transferred from the client side to the server side may include exposure information, lens configuration, slider positions, default settings, filters to be applied, and/or any other information which may be used to control the image data in some manner.

While the foregoing is directed to embodiments of the invention, other and further embodiments of the invention may be devised without departing from the basic scope thereof. For example, aspects of the present invention may be implemented in hardware or software or in a combination of hardware and software. One embodiment of the invention may be implemented as a computer program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., a hard-disk drive or any type of solid-state random-access semiconductor memory) on which alterable information is stored. Such computer-readable storage media, when carrying computer-readable instructions that direct the functions of the present invention, are embodiments of the invention.

What is claimed is:

1. A computer program product embodied on a non-transitory computer readable medium, comprising:
    code for receiving an image stack from at least one client device, the image stack comprised of at least a first image and a second image;
    code for storing the received image stack;
    code for generating a first synthetic image based on the first image and the second image;
    code for generating a viewing parameter, wherein the generating includes data associated viewing the first synthetic image, a processed image, the first image, the second image, or any other image associated with the image stack;

code for generating a dynamic image object based on metadata and image data, wherein the image data includes at least one of the image stack and the first synthetic image;
code for storing the dynamic image object;
code for generating an output image utilizing the dynamic image object and the viewing parameter;
code for outputting the output image, wherein the outputting includes at least two of:
transmitting, to the at least one client device, the dynamic image object,
transmitting, to the at least one client device, one or more additional synthetic images comprising the dynamic image object, or
sharing the dynamic image object.

2. The computer program product of claim 1, wherein the computer program product is operable such that first image is an ambient image and the second image is a flash image.

3. The computer program product of claim 1, wherein the computer program product is operable such that the first image and the second image are stored in the dynamic image object, for use in the generation of the output image.

4. The computer program product of claim 1, wherein the computer program product is operable such that metadata is stored in the dynamic image object, for use in the generation of the output image.

5. The computer program product of claim 4, wherein the computer program product is operable such that the metadata includes image metadata.

6. The computer program product of claim 4, wherein the computer program product is operable such that the metadata includes view behavior metadata.

7. The computer program product of claim 4, wherein the computer program product is operable such that the metadata includes generation behavior metadata.

8. The computer program product of claim 1, wherein the computer program product is operable such that at least one processed image corresponding to at least one of the first image or the second image is stored in the dynamic image object, for use in the generation of the output image.

9. The computer program product of claim 1, wherein the computer program product is operable such that a second synthetic image based on the synthetic image and at least one of the first image or the second image is stored in the dynamic image object, for use in the generation of the output image.

10. The computer program product of claim 1, wherein the computer program product is operable for making the dynamic image object accessible over a network.

11. The computer program product of claim 1, wherein the computer program product is operable such that the dynamic image object is identified by receiving the dynamic image object from a server.

12. The computer program product of claim 1, wherein the computer program product is operable such that the dynamic image object is identified by receiving the dynamic image object on the at least one client device.

13. The computer program product of claim 1, wherein the computer program product is operable such that the viewing parameter is user selectable.

14. The computer program product of claim 1, and further comprising application code for utilizing the dynamic image object to generate the output image, where the viewing parameter is capable of being adjusted utilizing the application code.

15. The computer program product of claim 1, and further comprising code for displaying sliding indicia, where the viewing parameter is capable of being adjusted in response to sliding user manipulation of the sliding indicia.

16. The computer program product of claim 1, wherein the computer program product is operable such that the viewing parameter includes at least one of a device type, screen size, processor type, amount of RAM, or input type.

17. The computer program product of claim 1, wherein the computer program product is operable such that the output image is generated utilizing the synthetic image and at least one of the first image or the second image.

18. An apparatus, comprising:
at least one processor for:
receiving an image stack from at least one client device, the image stack comprised of at least a first image and a second image;
storing the received image stack;
generating a first synthetic image based on the first image and the second image;
generating a viewing parameter, wherein the generating includes data associated viewing the first synthetic image, a processed image, the first image, the second image, or any other image associated with the image stack;
generating a dynamic image object based on metadata and image data, wherein the image data includes at least one of the image stack and the first synthetic image;
storing the dynamic image object;
generating an output image utilizing the dynamic image object and the viewing parameter;
outputting the output image, wherein the outputting includes at least two of:
transmitting to the at least one client device the dynamic image object,
transmitting to the at least one client device one or more additional synthetic images comprising the dynamic image object, or
sharing the dynamic image object.

19. A method, comprising:
receiving an image stack from at least one client device, the image stack comprised of at least a first image and a second image;
storing the received image stack;
generating a first synthetic image based on the first image and the second image;
generating a viewing parameter, wherein the generating includes data associated viewing the first synthetic image, a processed image, the first image, the second image, or any other image associated with the image stack;
generating a dynamic image object based on metadata and image data, wherein the image data includes at least one of the image stack and the first synthetic image;
storing the dynamic image object;
generating an output image utilizing the dynamic image object and the viewing parameter;
outputting the output image, wherein the outputting includes at least two of:
transmitting to the at least one client device the dynamic image object,
transmitting to the at least one client device one or more additional synthetic images comprising the dynamic image object, or
sharing the dynamic image object.

* * * * *